(12) United States Patent
Kanso et al.

(10) Patent No.: US 8,006,130 B2
(45) Date of Patent: Aug. 23, 2011

(54) METHODS AND SYSTEMS FOR GENERATING AVAILABILITY MANAGEMENT FRAMEWORK (AMF) CONFIGURATIONS

(75) Inventors: Ali Kanso, Montreal (CA); Maria Toeroe, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 238 days.

(21) Appl. No.: 12/242,269

(22) Filed: Sep. 30, 2008

(65) Prior Publication Data
US 2009/0164832 A1 Jun. 25, 2009

Related U.S. Application Data

(63) Continuation-in-part of application No. 11/961,849, filed on Dec. 20, 2007.

(60) Provisional application No. 61/085,583, filed on Aug. 1, 2008.

(51) Int. Cl.
*G01F 11/00* (2006.01)
(52) U.S. Cl. ............................ 714/13; 714/16
(58) Field of Classification Search ................ 714/13
See application file for complete search history.

(56) References Cited

U.S. PATENT DOCUMENTS

| | | | |
|---|---|---|---|
| 6,618,805 B1* | 9/2003 | Kampe ............................ 713/1 |
| 6,691,244 B1* | 2/2004 | Kampe et al. ..................... 714/4 |
| 6,854,069 B2* | 2/2005 | Kampe et al. ..................... 714/4 |
| 7,222,268 B2* | 5/2007 | Zaifman et al. .................. 714/47 |
| 2003/0140333 A1* | 7/2003 | Odaka et al. .................... 717/115 |
| 2007/0088980 A1* | 4/2007 | Greenspan et al. ............. 714/13 |
| 2009/0044186 A1* | 2/2009 | Biro ................................. 718/1 |
| 2009/0113034 A1* | 4/2009 | Krishnappa et al. .......... 709/223 |
| 2009/0125621 A1* | 5/2009 | DeLima et al. ................ 709/223 |
| 2009/0164832 A1* | 6/2009 | Kanso et al. ..................... 714/1 |
| 2009/0171707 A1* | 7/2009 | Bobak et al. ...................... 705/7 |
| 2009/0171732 A1* | 7/2009 | Bobak et al. ...................... 705/8 |
| 2009/0172470 A1* | 7/2009 | Bobak et al. .................... 714/16 |
| 2009/0172668 A1* | 7/2009 | Bobak et al. .................. 718/100 |
| 2009/0172670 A1* | 7/2009 | Bobak et al. .................. 718/100 |
| 2009/0190758 A1* | 7/2009 | Pourzandi et al. ............ 380/255 |

OTHER PUBLICATIONS

Andras Kovi et al., An Eclipse-Based Framework for AIS Service Configurations, Springer Berlin Heidelberg, vol. 4526, May 21, 2007, pp. 110-126.
Service Availability TM Forum Application Interface Specification—Availability Management Framework SAI-AIS-AMF-B.02.01, Service Availability Forum Application Interface Specification, Jan. 1, 1900.
PCT Search Report from corresponding application PCT/IB2008/055014.

* cited by examiner

*Primary Examiner* — Scott T Baderman
*Assistant Examiner* — Kamini Patel
(74) *Attorney, Agent, or Firm* — Dilip C. Andrade; Ericsson Canada Inc.

(57) ABSTRACT

Techniques for generating a system model for use by and availability management framework (AMF) are described. Inputs are received, processed and mapped into outputs which are further processed into a configuration file in an Information Model Management (IMM) Service eXternal Markup Language (XML) format which can be used as a system model by an AMF.

21 Claims, 19 Drawing Sheets

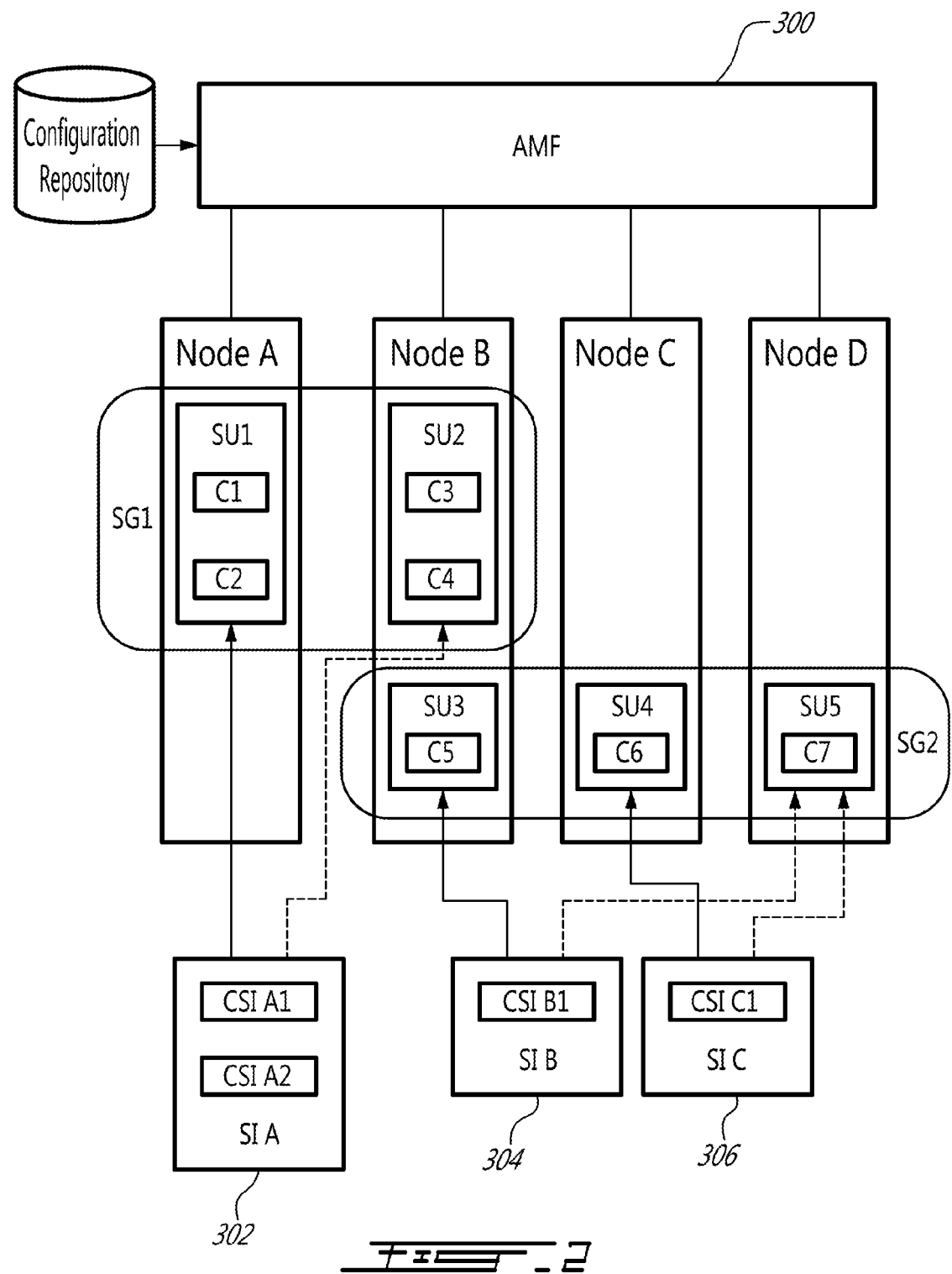

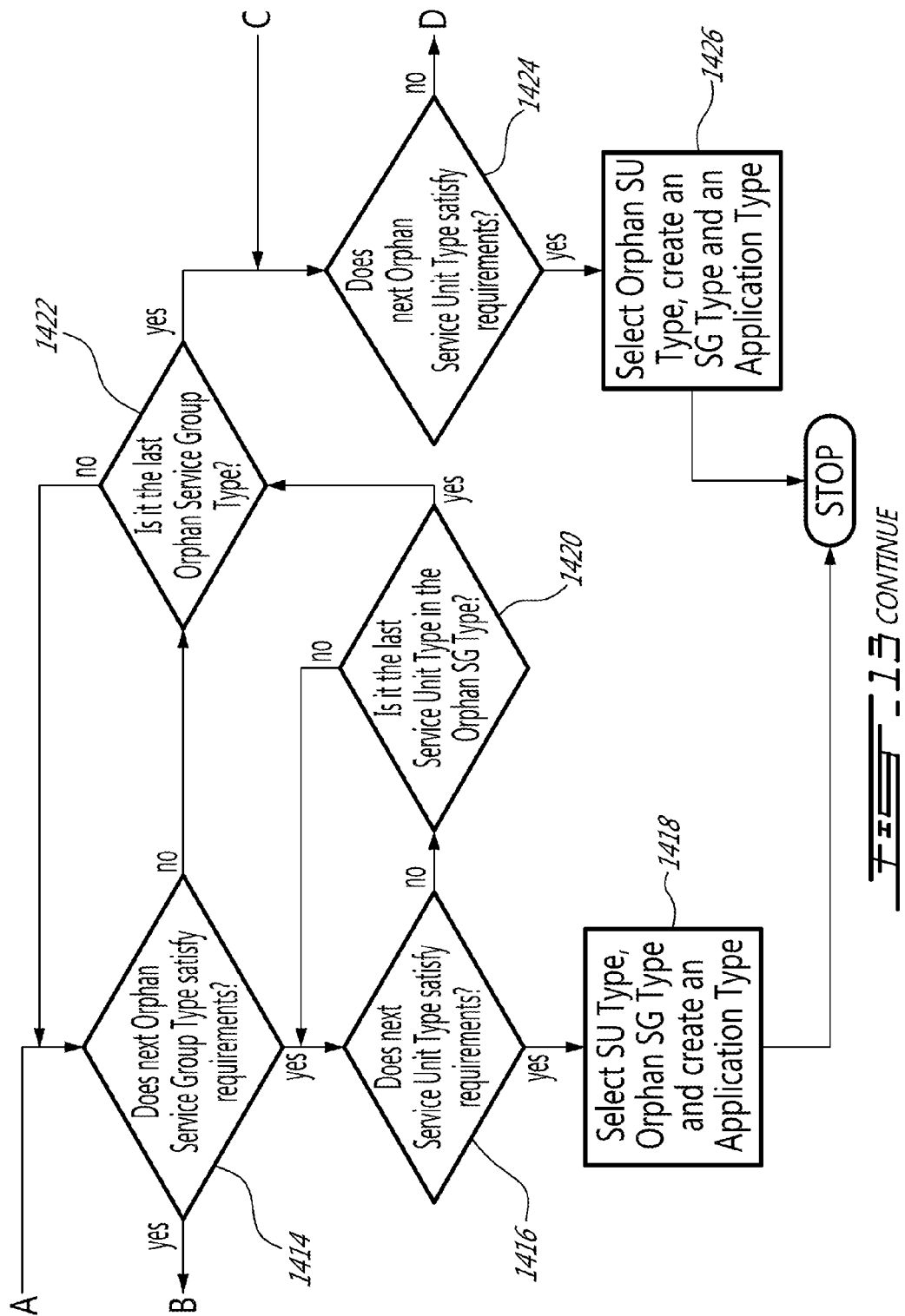
FIG. 13 CONTINUE

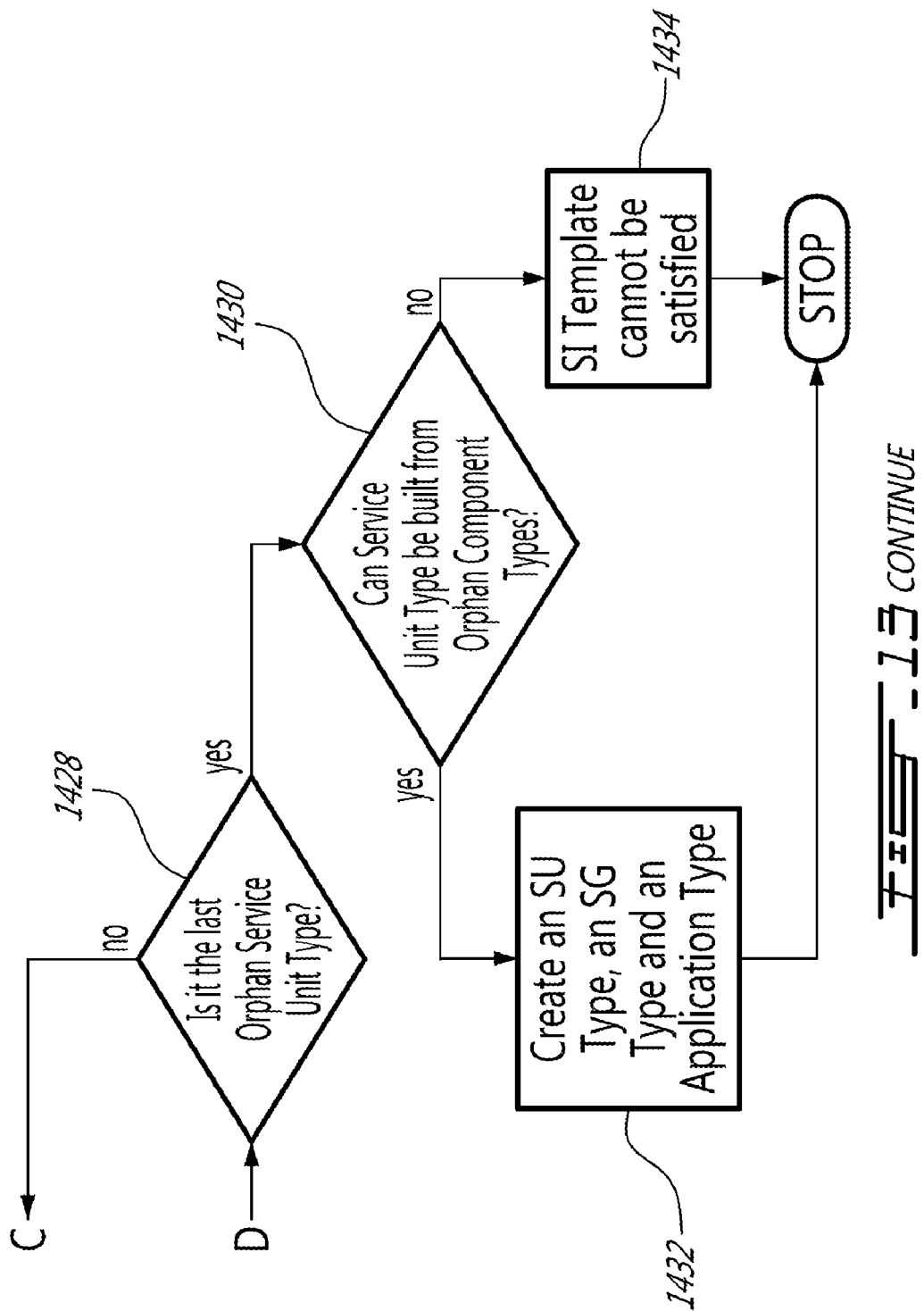
FIG-13 CONTINUE

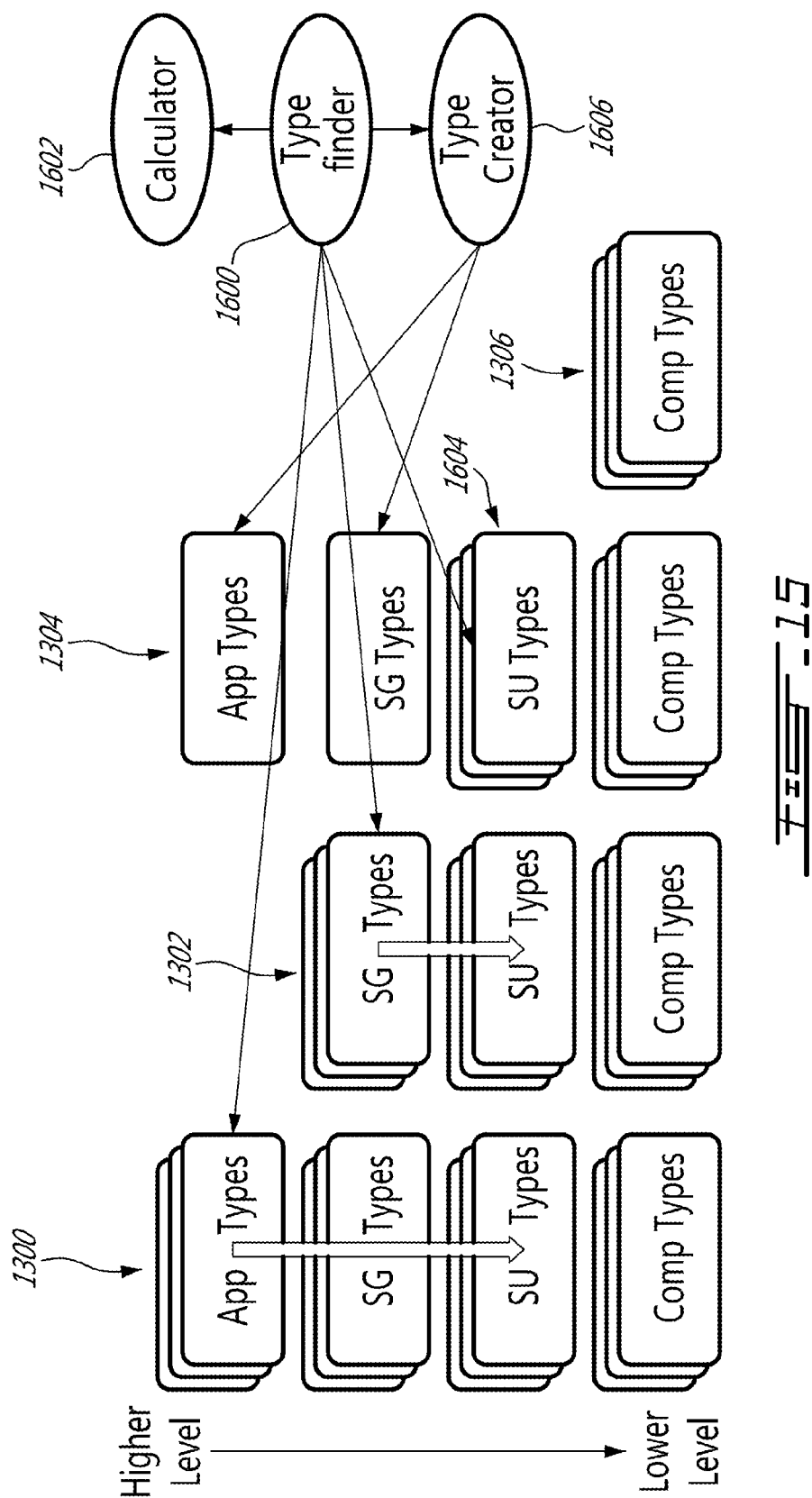

METHODS AND SYSTEMS FOR GENERATING AVAILABILITY MANAGEMENT FRAMEWORK (AMF) CONFIGURATIONS

RELATED APPLICATIONS

This application is a continuation-in-part of U.S. patent application Ser. No. 11/961,849, filed on Dec. 20, 2007, and entitled "Methods and Systems for Generating Availability Management Framework (AMF) Configurations", the disclosure of which is expressly incorporated here by reference. This application is also related to, and claims priority from, U.S. Provisional Patent Application Ser. No. 61/085,583, filed on Aug. 1, 2008, entitled "Automatic Generation of AMF Compliant Configuration Top-Down Approach", the disclosure of which is also expressly incorporated here by reference.

TECHNICAL FIELD

The present invention generally relates to high availability (HA) systems (hardware and software) and, more particularly, to HA systems managed by an Availability Management Framework (AMF).

BACKGROUND

High availability systems (also known as HA systems) are systems that are implemented primarily for the purpose of improving the availability of services which the systems provide. Availability can be expressed as a percentage of time during which a system or service is "up". For example, a system designed for 99.999% availability (so called "five nines" availability) refers to a system or service which has a downtime of only about 0.44 minutes/month or 5.26 minutes/year.

High availability systems provide for a designed level of availability by employing redundant nodes, which are used to provide service when system components fail. For example, if a server running a particular application crashes, an HA system will detect the crash and restart the application on another, redundant node. Various redundancy models can be used in HA systems. For example, an N+1 redundancy model provides a single extra node (associated with a number of primary nodes) that is brought online to take over the role of a node which has failed. However, in situations where a single HA system is managing many services, a single dedicated node for handling failures may not provide sufficient redundancy. In such situations, an N+M redundancy model, for example, can be used wherein more than one (M) standby nodes are included and available.

As HA systems become more commonplace for the support of important services such as file sharing, internet customer portals, databases and the like, it has become desirable to provide standardized models and methodologies for the design of such systems. For example, the Service Availability Forum (SAF) has standardized application programming interfaces (APIs) to aid in the development of portable, highly available applications. As shown in the conceptual architecture stack of FIG. 1, the AIS 10 is intended to provide a standardized interface for the HA middleware 16 to support HA applications 14. As described below, each set of AIS functionality is associated with an operating system 20 and a hardware platform 22. The reader interested in more information relating to the AIS standard specification is referred to Application Interface Specifications (AIS), Release 5, which is available at www.saforum.org, the disclosure of which is incorporated here by reference.

Of particular interest for the present application is the Availability Management Framework (AMF), which is a software entity defined within the AIS specification. According to the AIS specification, the AMF is a standardized mechanism for providing service availability by coordinating redundant resources within a cluster to deliver a system with no single point of failure. The AMF provides a set of application program interface (API) functions which are used, among other things, to set the states of components within a cluster and to determine the health of those components. The components are also provided with the capability to query the AMF for information about their state. An application which is developed using the AMF APIs and following the AMF system model leaves the burden of managing the availability of its services to the AMF. Thus, such an application does not need to deal with dynamic reconfiguration issues related to component failures, maintenance, etc.

The AIS standard also defines the information model (IM) for applications to be controlled by AMF. According to this IM, a service unit (SU) as a logical entity that aggregates a set of components, thereby combining their individual functionalities to provide a higher level service. A service unit can contain any number of components, but a particular component can be configured in only one service unit. Since each component is always enclosed in a service unit, from the AMF's perspective, the service unit can be considered the incremental unit of redundancy in the sense that it is the smallest logical entity that can be organized into groups in a redundant manner to provide and protect the service instances.

A service group (SG) is defined within the AMF information model as a logical entity that groups one or more SUs in order to provide service availability for a particular set of service instances according to a particular redundancy model. The AMF information model also defines an application as being a logical entity that contains one or more SGs. An application combines the individual functionalities of the constituent service groups to provide a higher level of service. From a software administration point of view, this grouping into an application reflects the set of SUs and contained components that are delivered as a consistent set of software packages to the AMF environment. Within this environment, by introducing the software management framework (SMF), the AMF information model was extended with types that allow the characterization of software developed for SAF systems, e.g., software which is used to provide HA services managed by the AMF.

This software can typically be deployed in different configurations depending on, for example, the characteristics of the system it is deployed on, the number of nodes and their characteristics, the capabilities of the AMF implementation and the requirements put on the provided services. Thus, a software vendor can describe their software such that it would allow for the widest possible usage by describing various AMF related characteristics of the software. Based on this a system integrator has to produce a particular configuration for the system the software is deployed on. However, none of the current SAF specifications define how to generate the information model, i.e., the configuration to be used by an AMF implementation in a particular system for a particular application. Therefore, one option for creating an information model would be to create it manually. Considering the potential for an AMF configuration file to have hundreds if not thousands of lines of code to be properly defined, creating a configuration file in a manual manner will be time consuming and prone to errors.

Accordingly, it would be desirable to provide systems and methods automating the generation of configurations for an AMF system or process.

SUMMARY

Systems and methods according to the present invention address this need and others by automating the generation of configurations for an AMF system or process.

According to an exemplary embodiment, a method for generating a configuration for an Availability Management Framework (AMF) includes the steps of selecting entity types from an entity types file which can provide a set of service instances by first evaluating entity types associated with an application type in the entity types file, generating entities associated with the selected entity types; and distributing at least some of the generated entities on nodes of a cluster.

According to another exemplary embodiment, a system includes a processor for generating a configuration for an Availability Management Framework (AMF), including performing the functions of: selecting entity types from an entity types file which can provide a set of service instances by first evaluating entity types associated with an application type in the entity types file, generating entities associated with the selected entity types; and distributing at least some of the generated entities on nodes of a cluster.

According to another exemplary embodiment a computer-readable medium contains instructions stored thereon which, when executed by a computer or a processor, perform the steps of: selecting entity types from an entity types file which can provide a set of service instances by first evaluating entity types associated with an application type in the entity types file, generating entities associated with the selected entity types; and distributing at least some of the generated entities on nodes of a cluster.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 shows an exemplary AMF managed system including service groups, service units and components;

FIG. 15 depicts searching for types and creating types according to an exemplary embodiment; and FIG. 16 is a flowchart illustrating a method for generating an AMF configuration according to an exemplary embodiment.

DETAILED DESCRIPTION

Figure 1:
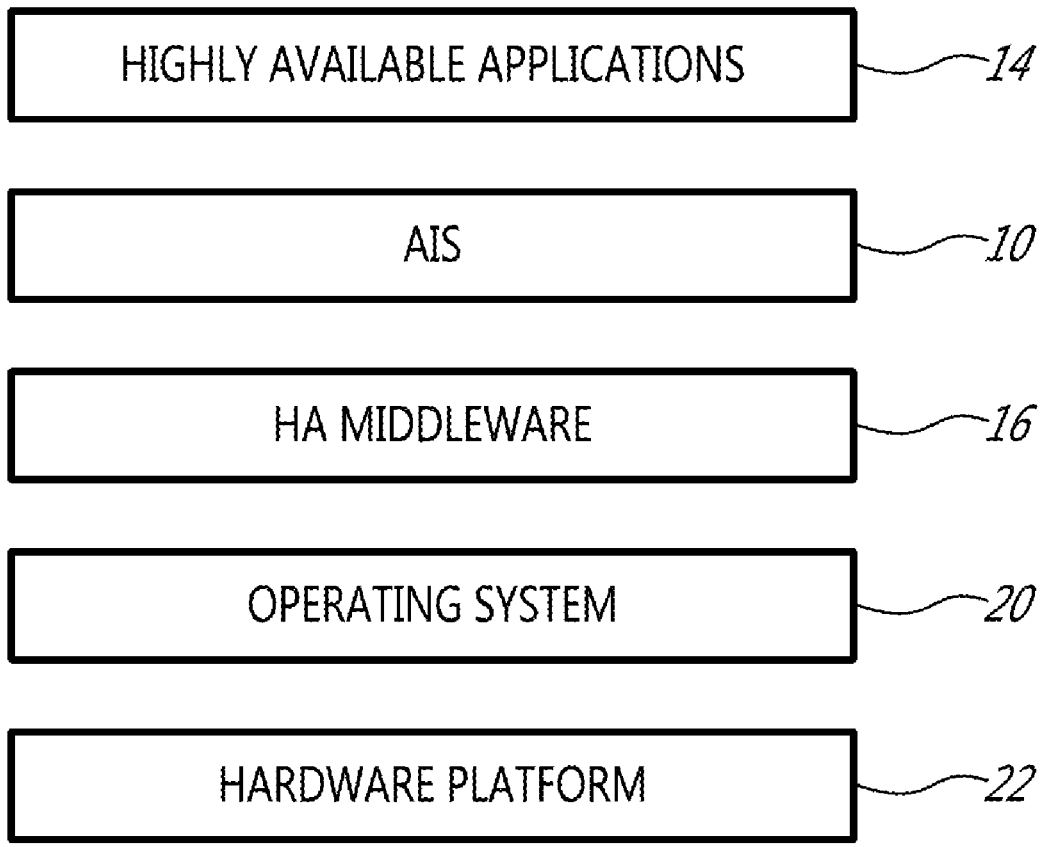
FIG. 1 illustrates a conceptual architecture stack associated with application interface services (AIS)

The following description of the exemplary embodiments of the present invention refers to the accompanying drawings. The same reference numbers in different drawings identify the same or similar elements. The following detailed description does not limit the invention instead, the scope of the invention is defined by the appended claims.

To provide some additional context for this discussion, consider an exemplary Availability Management Framework (AMF) controlled High Availability (HA) system as shown in FIG. 2. Therein, four nodes (A, B, C and D) are associated with two service groups (SG1 and SG2). A service group is a group of service units (SUs) which provide service availability for one or more service instances (SIs) of particular services. For example, SG1 includes SU1 and SU2 which, in this example, support an instance of an e-mail service (hardware and software) and SG2 includes SU3, SU4 and SU5, which support two instances of a fax service (hardware and software). At runtime, for the email service instance SIA supported by SG1, AMF 300 may select to assign SU1 the active state and SU2 the standby state.

Each of the exemplary service units in SG1 has two components associated therewith. A component is the smallest logical entity on which the AMF 300 performs error detection and isolation, recovery, and repair. Thus, a component typically includes all of the functions which cannot be clearly separated for error containment or isolation purposes. The component is also the logical entity that a portion of a workload is assigned within the provisioning of a service instance, e.g. the email service. Such a portion of the workload is called a component service instance (CSI). The email service instance SI A is composed of two component service instances CSI A1 and CSI A2. Each of these can be assigned to a component within a service unit. Components can further be grouped into protection groups which reflect the redundancy associated with provisioning of the component service instances. For example, components C1 and C3 can form a first protection group for CSI A1 and components C2 and C4 can form a second protection group for CSI A2, both of which are associated with the email service instance SI A. Thus if component C1 fails while being assigned active for CSI A1 and C3 assigned as standby, the AMF 300 could fail over CSI A1 to component C3 the active state and, similarly, if component C2 fails while being active for CSI A2, then the AMF 300 could fail over CSI A2 to component C4 the active state. At the time of the fail over of CSI A1, AMF 300 will switch over or will fail over CSI A2 as well so the entire service unit SU2 becomes assigned active for the entire service instance SI A.

Service group SG2 illustrates a slightly different configuration wherein two instances of a fax service are supported by three service units SU3, SU4 and SU5. For example, SU3 and SU4 could each be assigned by AMF 300 the active state such that each supports one instance of the fax service, while SU5 could be assigned the standby state and operate as their redundant backup. In this case, components C5 and C7 would form one protection group associated with one of the two fax service instances SI B and within that protect component service instance CSI B1. Components C6 and C7 could form a second protection group to protect CSI C1 associated with the other SI C of the two fax service instances.

In the above described examples, service groups, service units and components can all considered to be logical entities associated with physical entities that perform work. These logical entities are assigned workloads in order to render the service, e.g., email or fax service. A component service instance (CSI) represents the workload that the AMF 300 can dynamically assign to a single component. Component service instances are grouped into a logical entity called a service instance (SI). A service instance aggregates all component service instances to be assigned to the individual components of the service unit in order for the service unit to provide that particular service instance, e.g., email or fax service. A service instance represents a single workload assigned to the entire service unit. As shown in FIG. 2, service instances are shown as well as their relationship with the components, service units and service groups on the four nodes. More specifically, for SIA 302, SU1 is assigned the active HA state and SU2 is assigned the standby HA state (as shown by the dashed connecting line). For SIA 302, two CSIs (A1 and A2) are assigned to components C1 and C3, and to C2 and C4, respectively. Regarding SIB 304, SU3 is assigned the active HA state and SU5 is assigned the standby state (as shown by the dashed connecting line). Similar comments apply towards SIC 306.

Figure 3A:
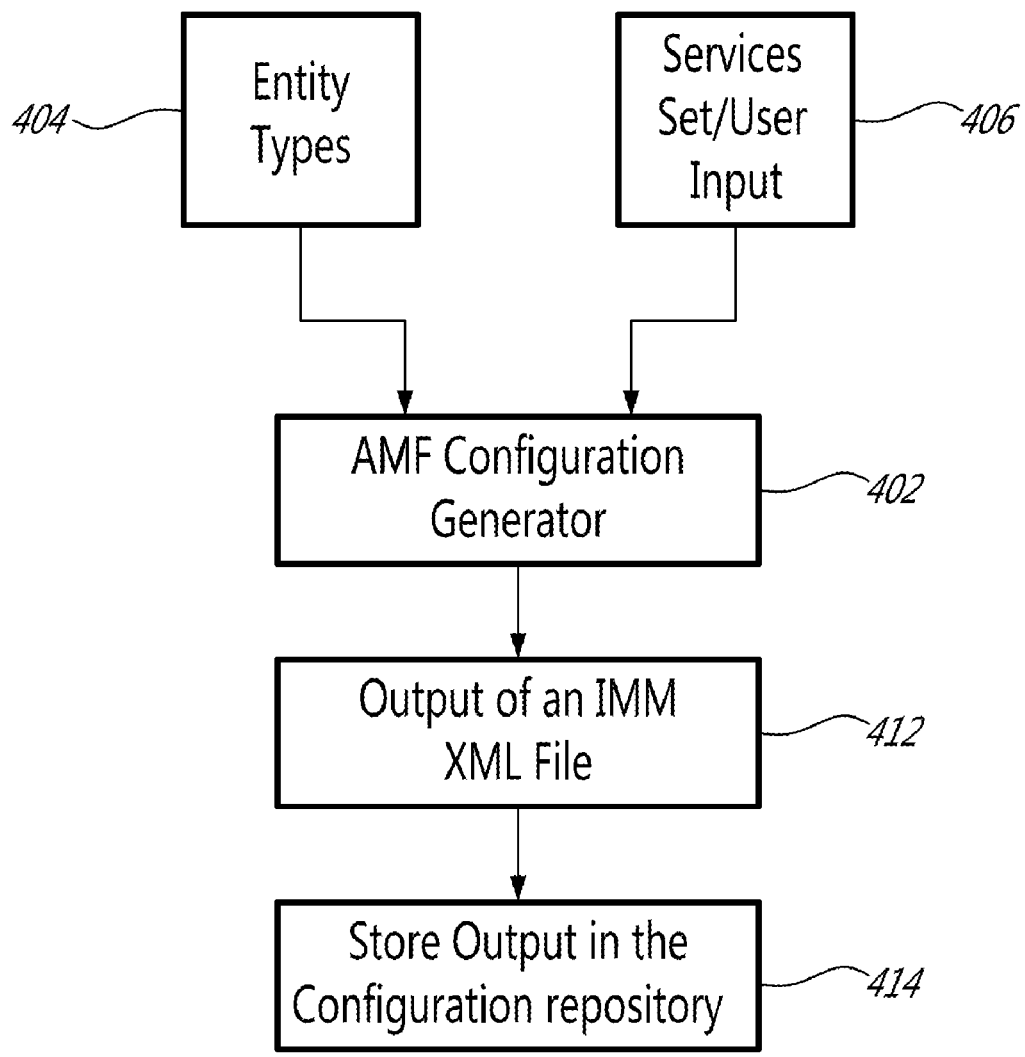
FIG. 3(a) depicts a high level flowchart for generating an AMF configuration according to exemplary embodiments.

For an AMF software entity 300 to operate in the above described exemplary manner, the AMF software entity 300 needs to receive from a configuration repository 310 an input, file or system model which describes what is to be managed. In a Service Availability Forum (SAF) cluster the Information Model Management Service (IMM) typically serves as the configuration repository 310. According to one exemplary embodiment, such configuration information can take the form of an XML (eXternal Markup Language) file, however it will be appreciated that the particular form or format of the configuration input is not critical. According to exemplary embodiments, a high level method for generating the configuration input an AMF application will now be described with respect to FIG. 3(a). Initially an AMF Configuration Generator 402 receives inputs of entity types 404, e.g., as entity types files (ETFs) and services set/user input 406 to perform a mapping function which creates a system model for future use. This system model is output by the AMF Configuration Generator 402 in the form, for example, an XML file according to the SAF Information Model Management (IMM) Service XML schema 412. This output code in an IMM XML file 412 is then stored in the configuration repository 310 in step 414. These various inputs and steps will be described in more detail below.

The first exemplary input is entity types 404 which describe, for example, various AMF related characteristics associated with application software to be controlled by the AMF system. These entity types 404 are AMF entity types described in XML entity types files, as described by the SAF Software Management Framework (SMF) specification SAI-AIS-SMF-A.01.01 which is available at www.saforum.org, the disclosure of which is incorporated here by reference.

From the SAF specifications, there are currently two mandatory AMF entity types that need to accompany any application software intended for such systems. These two entity types are the component types (CompType) and their respective component service types (CST). Other entity types may also be provided as inputs 404, however, they do not have to be present in an entity types file if the software implementation has no restrictions related to them.

The second exemplary type of input is the services set/user input 406. The services set/user input 406 typically includes information related to the services the site provides for which the AMF configuration is being created. In the AMF environment the services set/user input 406 is a set of service instances in which each service instance is described by a set of component service instances as well as other desired user inputs, e.g., a number of nodes provided with the system providing the service or services and the desired redundancy model to protect them. The services set/user input 406 is typically site specific. This exemplary method involves using SI templates each of which describe a set of SIs that shall be protected by SGs of the same type. Within each SI template the CSIs are also defined via CSI templates. The SI templates are typically based on the service types (SvcType) provided as service set/user input 406 or by the entity types files. The service type determines the composing CS types (CST) and any limits for the number of component service instances that an SI of the service type may contain. Accordingly, the CSI templates are based on the CS types provided with the software and the user input needs to indicate which CS types are used from these and how many instances of them are desired for the composition of an SI of the particular SI template. An SI template also defines the number of SIs to be configured based on this template and their grouping to SGs. Additionally, the desired redundancy model is typically input by a user and included in the SI template. Another input typically received by the AMF Configuration Generator 402 from the services set/user input 406 is the number of nodes. The number of nodes input is used to assign the service units of the configuration to nodes according to different criteria (e.g. implement hardware redundancy, load balancing among cluster nodes, etc.) if necessary. This information may be provided as a user input to the AMF Configuration Generator 402, or collected from the target system by other SAF services.

These exemplary input entity types 404 and services set/user input 406 are received at the AMF Configuration Generator 402 where the inputs are processed to generate a system model for a specific AMF configuration. A general discussion of the configuration generation will now be provided followed by a detailed (but purely exemplary) pseudo-code implementation. References to the pseudo code implementation are priced in the text below in parentheses.

Initially the exemplary configuration generation method (generateConf method) begins by matching each received SI template with the entity types 404 provided. A suitable SU type is selected from among those in the received input set (findSUType method). This selection method checks the SU types for the capability of providing the desired service type that the SI template refers to. If there are such SU types available, then one is selected by matching the capabilities of the component types of the SU type for each of the component service types with the capabilities required for providing the specified component service type by the CSI templates (findCompType method) in the required redundancy mode required by the enclosing SI template. According to one exemplary embodiment, the selection method finds the SU type(s) that provide the CSI(s) with the minimum number of components, i.e., the selection criterion results in maximizing the utilization of each component in the configuration. However, other selection criterion can be used as desired.

For the case where the selection criterion results in no SU types found that provide the desired composition of CSIs, this exemplary configuration generator 402 can determine whether the available component types can be grouped in another manner to construct a new, desired SU type. This can occur as part of the findSUType and findCompType pseudo-code functions described below, i.e., the findCompType method adds an appropriate component type from the complete set of component types to the newly constructed SU type for each set of CSIs that needs to be protected. This determination as to whether new SU types may be constructed is typically based upon a user input, e.g., a yes or no input regarding whether the AMF Configuration Generator 402 is permitted to perform new SU type construction. If a no is submitted then only the submitted types will be used. If a yes is submitted, then the submitted SU types will preferably be used, however, if the submitted SU types are found to be insufficient, the AMF Configuration Generator 402 will have the option to attempt to create an appropriate SU type. Once an SU type is found or constructed, this exemplary method chooses an appropriate SG type from the available set of SG types based on the features defined by the user for the desired redundancy model in the SI template. If no such appropriate SG type is available, a new SG type is created using input parameters found within the SI template.

Upon completion of finding the appropriate entity types, the AMF Configuration Generator 402 generates the entities, i.e., instances of these types (generateConf method) that can provide the desired services (createSis method). The configuration is populated so that both the active and the standby assignments of each SI protected by each SG can be satisfied. This is done by creating one SU with the required number of components so that the SU provides the required active and standby capabilities for all of the SIs as necessary and within them for all CSIs. Once all of the components of the first SU have been added, other SUs required by the redundancy model are copied from this first SU as desired for the HA environment to create a first SG. This procedure is then repeated for each SG necessary to protect all the service instances generated from an SI template in the configuration that is currently being created. Additionally, one exemplary method for creating this configuration uses equal ranking and equal load between all SUs. Alternatively, other exemplary methods can be used.

For example according to one exemplary embodiment, instead of using equal ranking and load, different ranks can be assigned to the different SUs within an SG. A global rank can be assigned as well as a per SI rank. If only the global rank is specified then for SIs this is the rank that would be used. According to another exemplary embodiment, other factors can be used in assigning rank such as, for example, SI load based upon different resource needs, e.g., a database application would be storage/memory intensive. Also a collaboration of different applications, or the opposite, could be considered. According to one exemplary embodiment, populating this configuration can be complemented by using a method that generates, based on the previously generated SI and CSI templates, all (or a desired portion) of the SI and CSIs respective attributes.

Figure 3B:
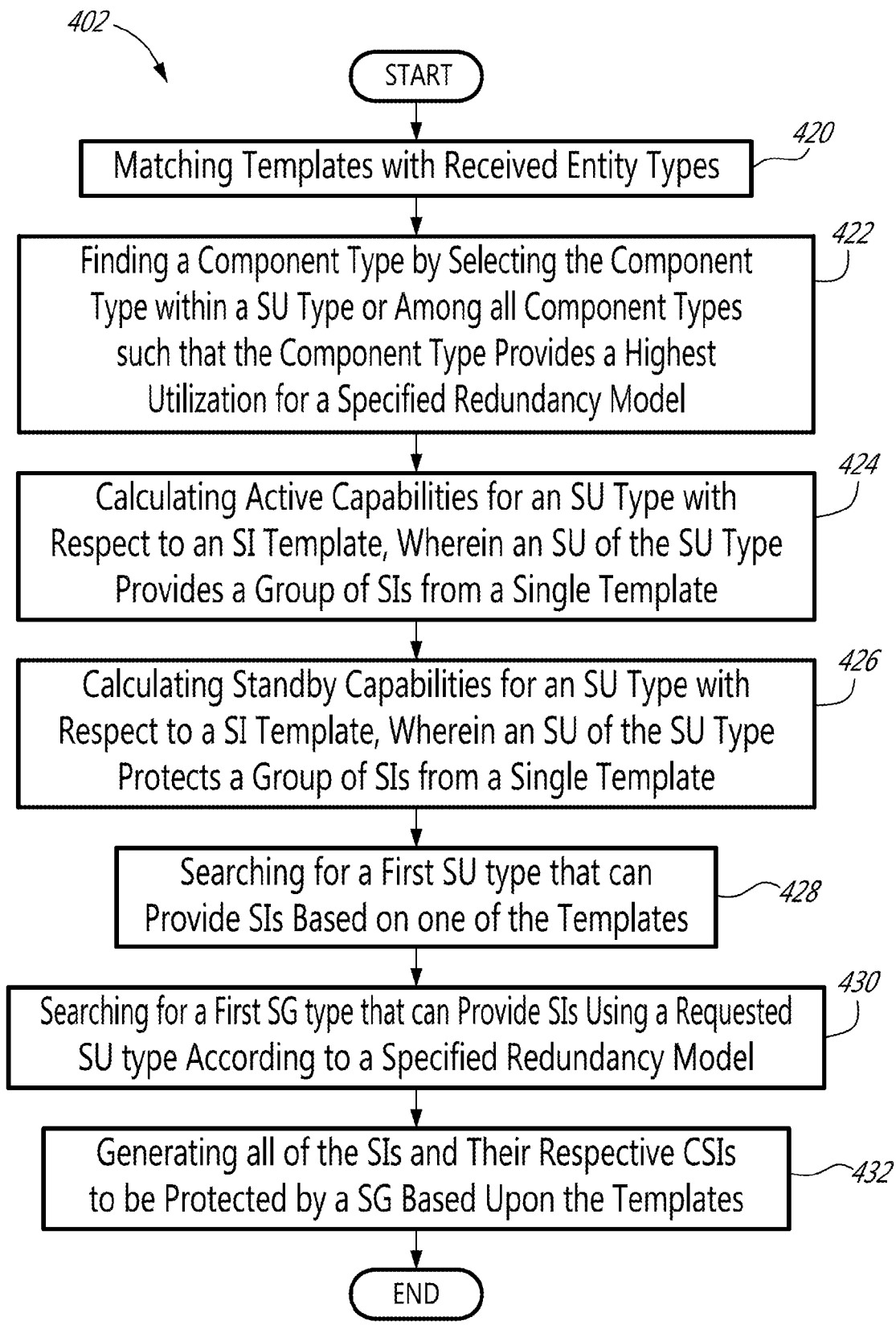
FIG. 3(b) shows processes that occur within an AMF configuration generator according to exemplary embodiments.

The exemplary processing described above with respect to the AMF Configuration Generator 402 will now be summarized as shown in the exemplary flowchart of FIG. 3(*b*).

Initially, each received SI template is matched with the received entity types 404 in step 420. Matching also occurs in the follow on steps as needed. Processing then continues by finding a component type by selecting the component type within an SU type or among all component types (provided it is permitted to construct a new SU type) such that the component type provides a highest utilization for a specified redundancy model in step 422. Calculating required active capabilities for an SU type within an SG with respect to an SI template, wherein an SU of the SU type provides a group of SIs from a single template occurs in step 424. Similarly, calculating required standby capabilities for an SU type with respect to an SI template, wherein an SU of the SU type protects a group of SIs from a single template occurs in step 426. The Configuration Generator 402 then searches for a first SU type that can provide SIs based on one of the templates in step 428. This leads to searching for a first SG type that can provide SIs using a requested. SU type according to a specified redundancy model in step 430. Once the necessary entity types have been identified the configuration generation proceeds with populating the configuration with the entities of these types. This begins with generating all of the SIs and their respective CSIs to be protected by an SG based upon the templates in step 432. A first SU is created for the SG and then others are copied to create the complete SG. A next set of SIs and CSIs can then be generated for the next SG. If the SIs belong to the same SI template, the SG is just copied, until all the SIs required by the template have been assigned to an SG. For the next SI template the process can be repeated starting with the creation of a first SU. The process ends when all the SGs have been created for all SI templates.

The configuration, e.g., a file, generated by this exemplary process can, for example, be in an IMM XML format for use by an AMF via IMM. As mentioned above, the elements of this configuration can be generated by a type matching process which loops on the SI templates: for each SI template the SG type, the SU type and the component types are selected. Exemplary pseudocode illustrating this process in more detail is provided below. For the instance generation described above, there are additional loops as multiple entities are created for each selected type. The configuration, e.g., IMM XML, contains both the entity types and all the generated entities. During configuration generation, SUs can be assigned to nodes by setting the appropriate attributes. This is an optional attribute, so the AMF can use this attribute when it is provided, otherwise the AMF distributes the SUs in an implementation specific way. Note also that it may not always be desirable to assign an SU to a node, e.g., when the SU is assigned to a node it cannot be instantiated by AMF anywhere else, in which case, if the node is faulty, that SU would be lost with the node. If no node is specified AMF will pick a node from among those available.

Using the above described exemplary embodiments, the AMF Configuration Generator 402 generates a configuration which becomes an output of code in, for example, an IMM XML file 412. This output of an IMM XML file 412 is preferably provided in an acceptable format for use by an AMF system as described in, for example, SAF Information Model Management (IMM) specification SAI-AIS-IMM-A.02.01. This exemplary code is then stored in a Configuration Repository 310 (or other desirable computer readable medium or memory storage unit) in step 414 for future use by an AMF.

An additional process that occurs at the end of the exemplary generation of an AMF configuration is the method for distribution of the SUs on the cluster nodes. The AMF specification does not currently describe performance characteristics for entities, therefore an exemplary method for distribution of SUs can assume that each SU of the configuration produces equal workloads with respect to each other and with or without assignment. It is at this point that the number of nodes to be used needs to be known by the system as either a received user input or by the system knowing what is available, e.g., information provided by another SAF service. Based on this assumption, this exemplary method distributes the SUs among the nodes of the cluster by selecting for each SU the node that has the smallest load and that has no (or the fewest number of) SUs of the same SG that the current SU belongs to. These conditions can be provided by using a global round robin distribution of the SUs as the SUs are being created during the configuration process. Alternatively, this exemplary distribution method can be modified by assuming, based on performance characteristics of the system, different capacities for the different nodes and different load for the different SUs. Also, another exemplary alternative embodiment for configuration could be based upon the assumption of different failure scenarios desiring to avoid or minimize overload situations when one or more SUs/nodes fail in the system.

Figure 4:
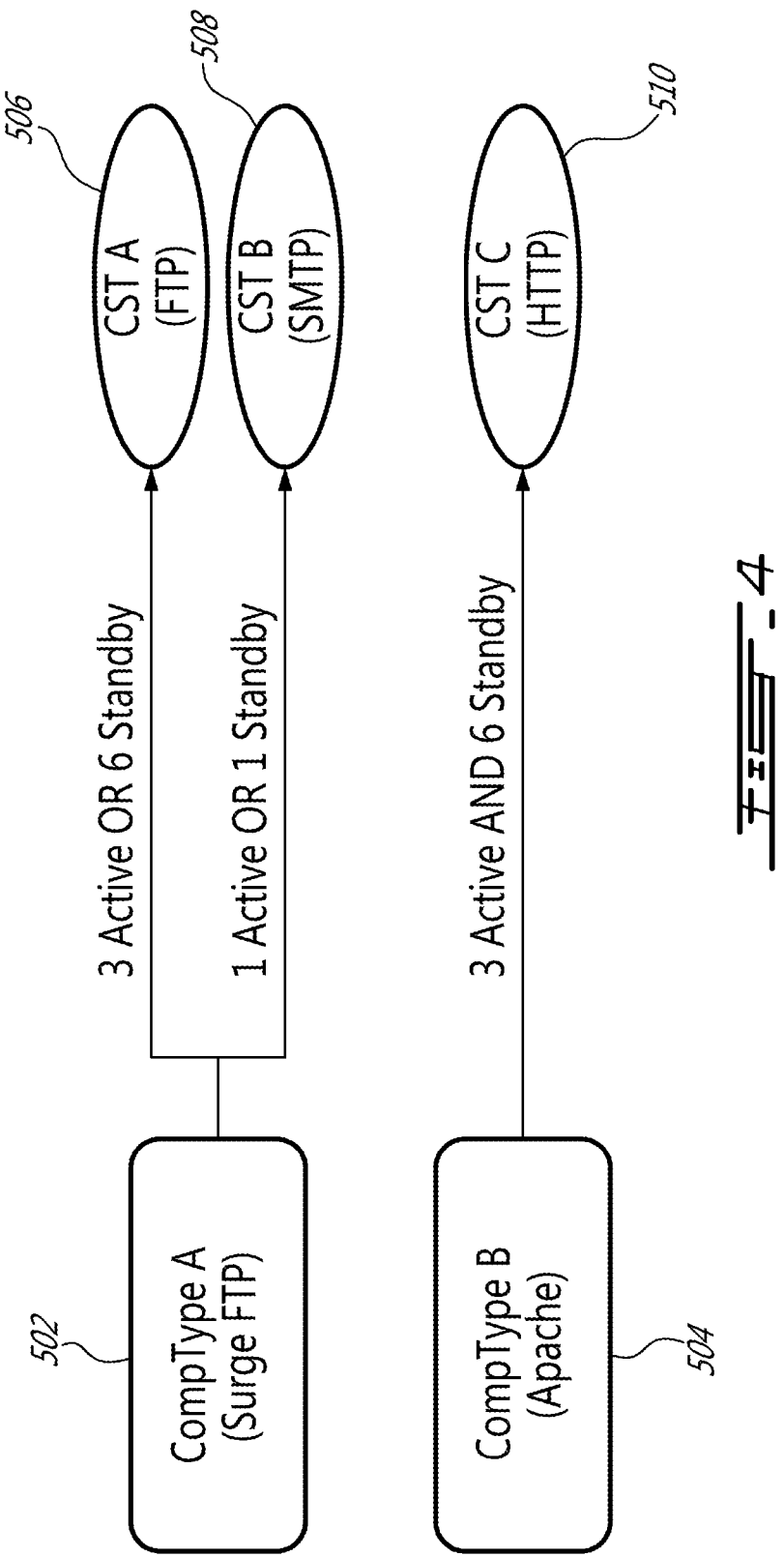
FIG. 4 is an illustration of component type categories according to exemplary embodiments.

To further illustrate the above described exemplary embodiments for generating an AMF configuration, a purely illustrative exemplary embodiment will now be described with respect to FIGS. 4-9. In this exemplary system, the goal is to support file transfer protocol (FTP) services, simple mail transfer protocol (SMTP) services and hyper text transfer protocol (HTTP) services in an HA environment by creating a configuration file for use by an AMF to manage these services in an HA environment. For the input entity types 404 there are both component types and component service types. As can be seen in FIG. 4, there are two component types labeled CompType A 502 named Surge FTP and CompType B 504 named Apache. CompType A 502 can provide up to three active or six standby assignments for CST A 506 for FTP and, CompType A 502 can also provide up to one active or one standby assignments for CST B 508 for SMTP. Regarding CompType B 504, it is capable of providing up to three active and six standby assignments for CST C 510 for HTTP.

Figure 5:
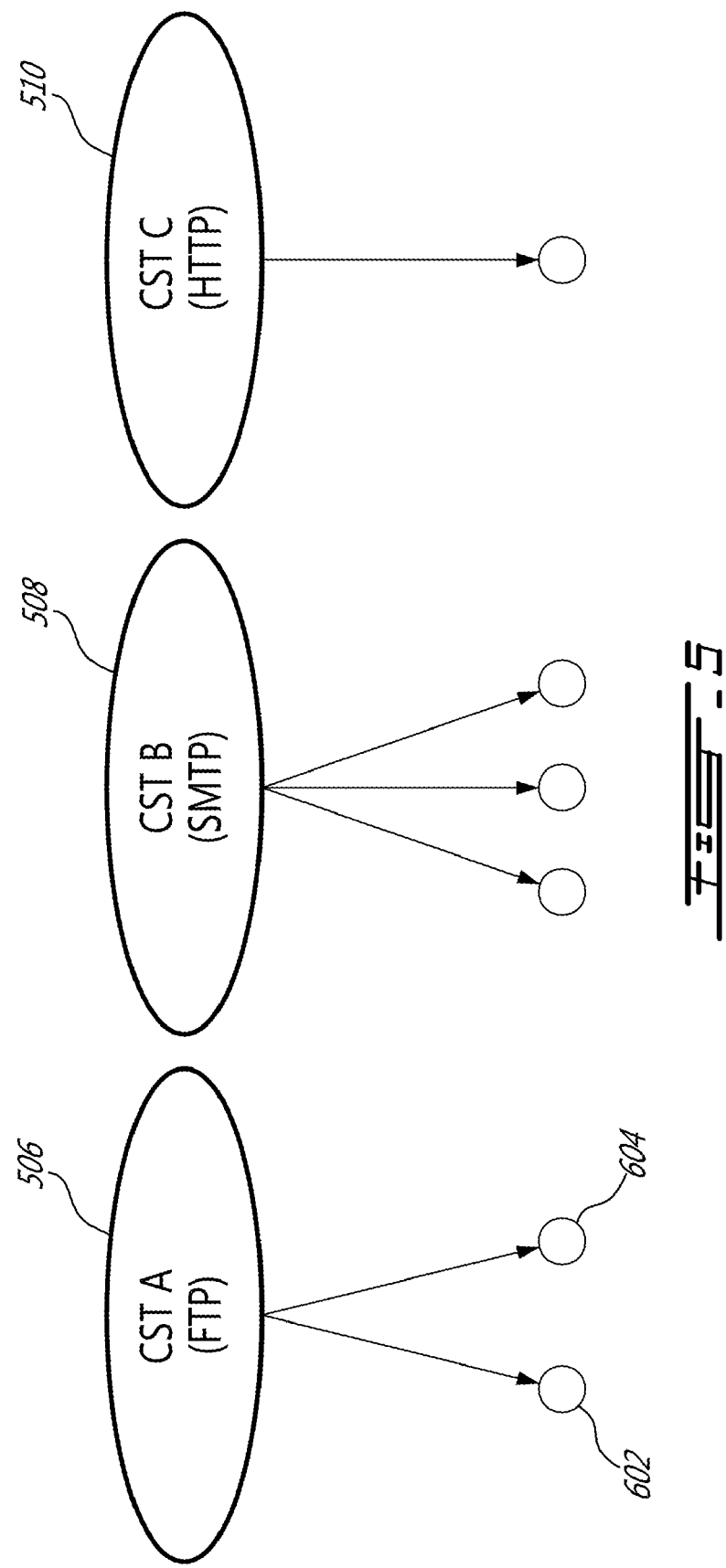
FIG. 5 shows component service types associated with attributes according to exemplary embodiments.

These various CSTs can have a number of different attributes associated with them as shown in FIG. 5. For example, CST A 506 for FTP is shown with two attributes 602 and 604 associated therewith. Attribute 602 could, for example, deal with IP ranges and attribute 604 could, for example, be associated with security levels. More or fewer attributes can be associated with a CST (as well as the other CSTs) as shown by CST B 508 for SMTP having three attributes and CST C 510 having just one attribute. These attributes associated with the CSTs are typically submitted as part of the input entity types 404 as they are determined by the way the software is implemented.

Figure 6:
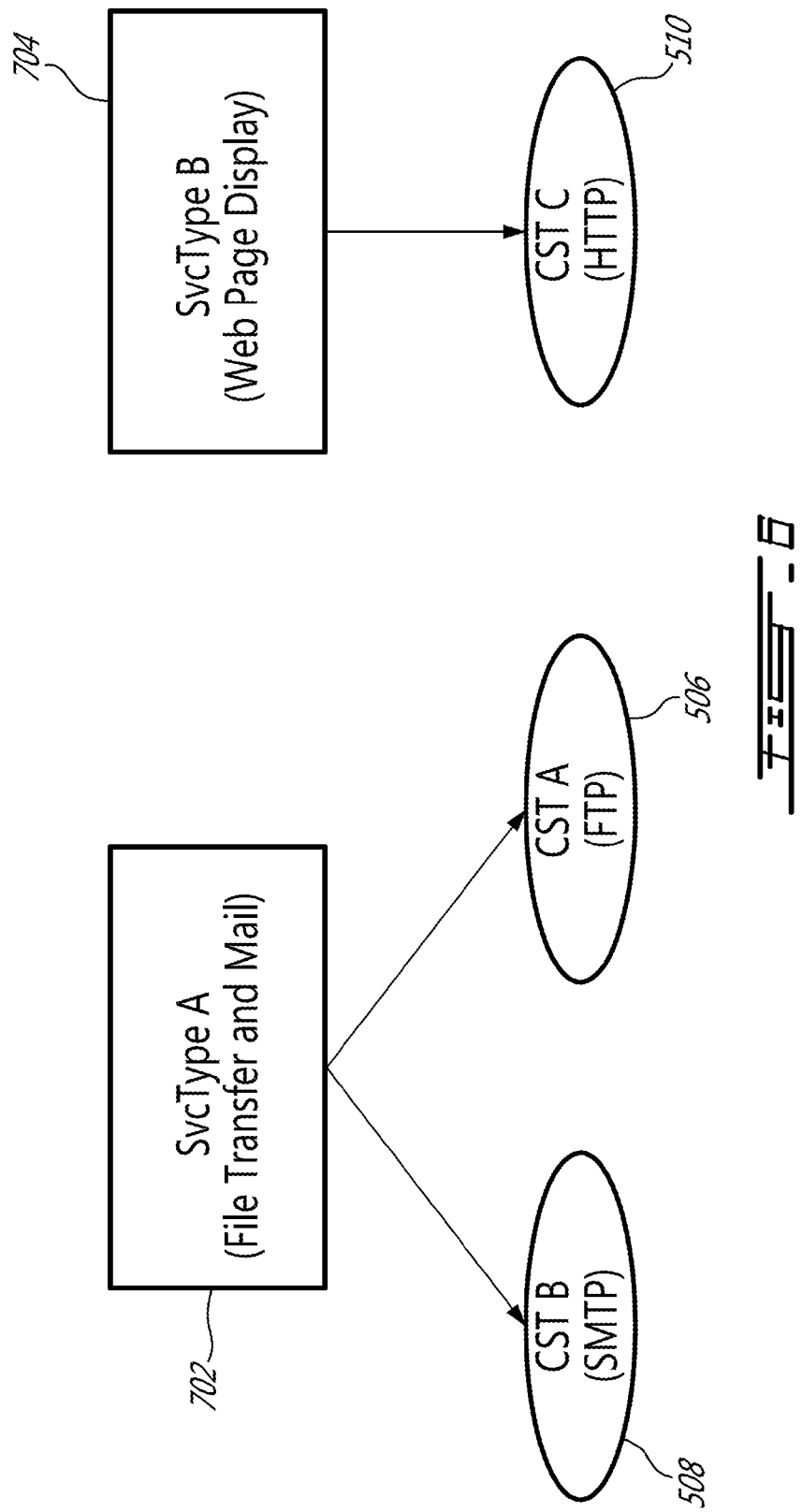
FIG. 6 shows service types associated with component service types according to exemplary embodiments.

CSTs are also associated with service types. For example, as shown in FIG. 6, two service types are shown, SvcType A 702 representing the file transfers and email service and Svc-Type B 704 which represents the web page display service. Accordingly, SvcType A 702 is associated with CST. B 508 and CST A 506 representing the FTP and SMTP component service types. SvcType B is solely associated with CST C 510, with HTTP. These service types can be submitted as either entity types inputs 404 or as part of the services set/user input 406. This then leads to the various templates submitted as part of the services set/user input 406.

Figure 7:
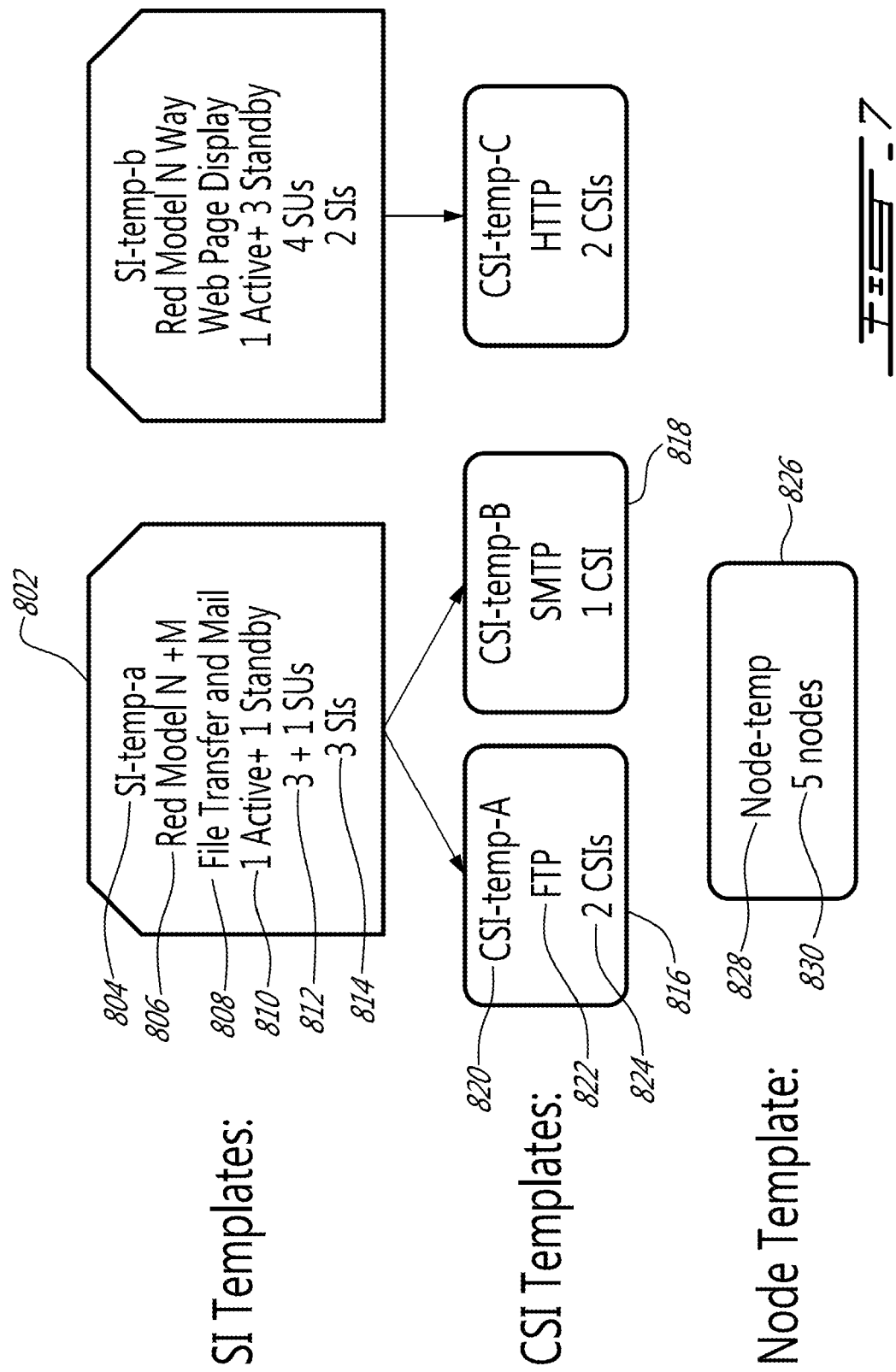
FIG. 7 illustrates service instance templates, component service instance templates and a node template according to exemplary embodiments.

According to exemplary embodiments, the services set/ user input 406 includes templates. Continuing with the current example, SI templates, CSI templates and a node template are illustrated in FIG. 7. An SI template 802 includes the following: a name, e.g., SI-temp-a 804; a redundancy model, e.g., N+M 806; a service type, e.g., File Transfer and Mail 808; the preferred number of active and standby assignments per SI, e.g., 1 Active+1 Standby 810; the values for N and M SUs as appropriate for the redundancy model, e.g., 3+1 SUs 812; and the desired number of SIs, e.g., 3 SIs. Associated with each SI template 802 are one or more CSI Templates 816 and 818. CSI template 816 includes a name, e.g., CSI-temp-A 820, a CST, e.g., FTP 822, and the number of CSIs in this case one 824. The other template is a node template 826 which includes a name 828 and the number of nodes 830 in the cluster. They are to be used for the distribution of the generated service units.

Figure 8:
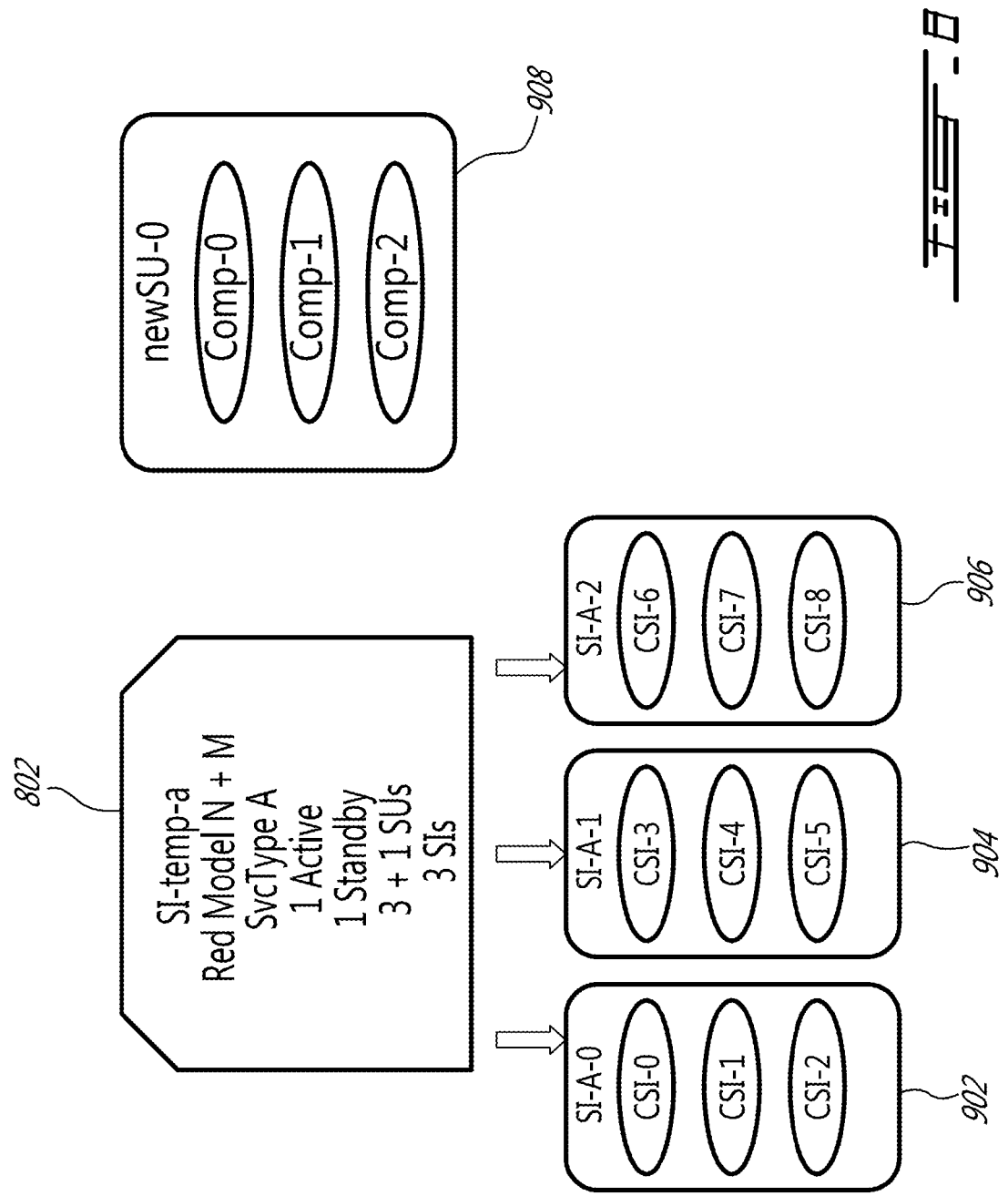
FIG. 8 illustrates a service instance template and the output service instances and a new service unit created according to exemplary embodiments.
Figure 9:
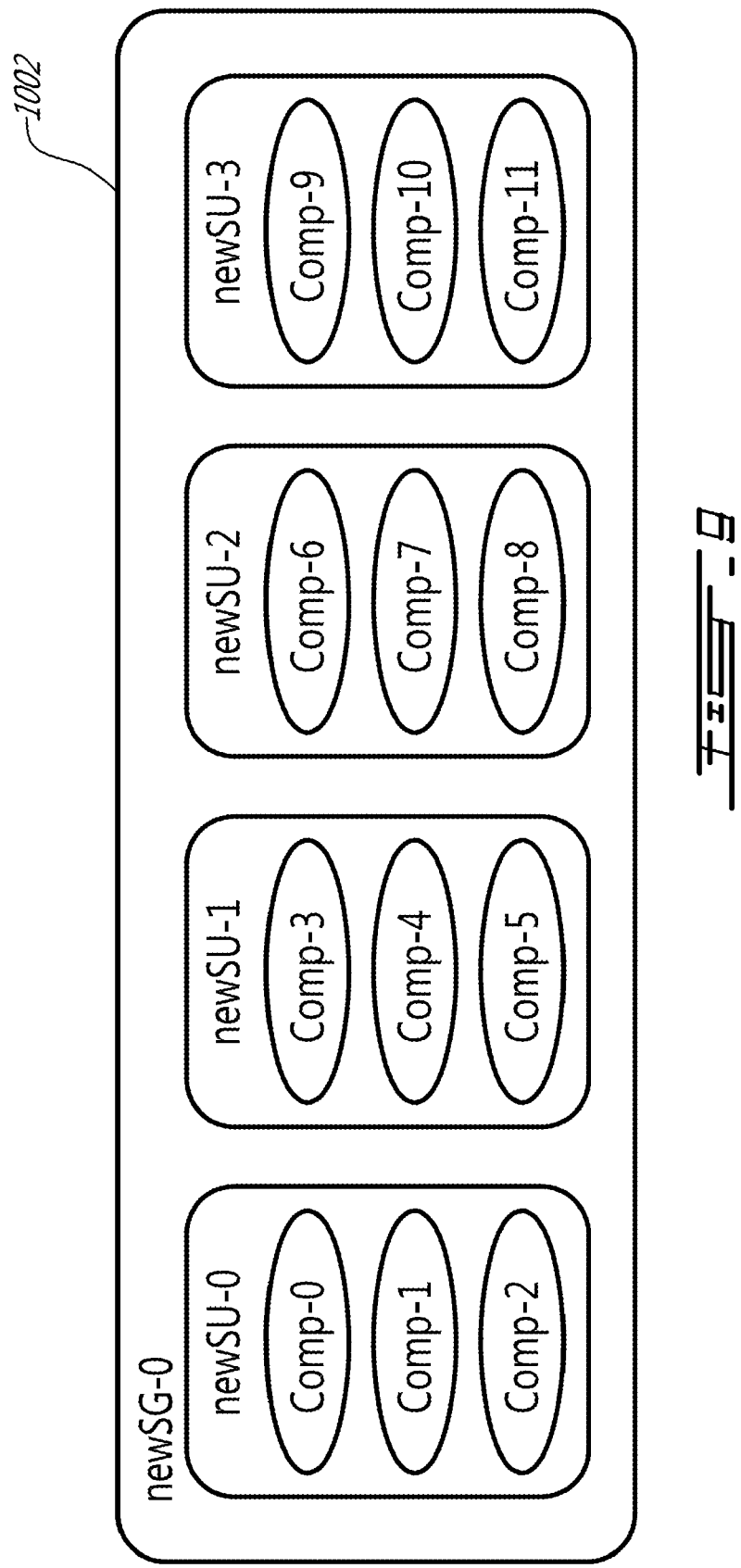
FIG. 9 shows a newly created service group according to exemplary embodiments.

At some point after filling in the desired templates, these desired templates as well as the entity types 404 are processed by the AMF Configuration Generator 402. For example, as shown in FIG. 8, SI template 802 is being processed by the AMF Configuration Generator 402. Using the received inputs as well as other known information, such as specified constraints for an AMF, outputs are generated by the AMF Configuration Generator 402. In this case, populated SIs 902, 904 and 906 are generated. Additionally, in this example, a first SU 908 is created of a (new) SU type to meet the desired needs associated with the SIs (902, 904 and 906) of the SI template 802. A new SU type was created if there was no acceptable available SU type and the orphan types allowed for the creation of new SU type as needed. Also, the Configuration Generator 402 determined that the best CompType for CST A and CST B is CompType A which allows the SU 908 to only use three components to support each of the SIs 902, 904 and 906, which have three CSIs associated with them. To meet another need as specified by the SI template 802, e.g., the provision of three active SUs and one standby SU 812, four SUs are created and deployed as shown in FIG. 9 as part of the new SG 1002.

According to exemplary embodiments, illustrative pseudo-code used for generating an AMF configuration is shown below. This illustrative pseudo-code is broken down into three sections: Inputs, Outputs and Configuration Generation, for ease of understanding. The Inputs section of pseudo-code corresponds to the various inputs that may be received by the AMF Configuration Generator 402. Some of them are mandatory (e.g. component type, component service type, SI templates), others may be generated by the configuration generator (e.g. SU type). The Outputs are building blocks of the final configuration created from the Inputs by the Configuration Generation. The Outputs together with some of the Inputs presented to an AMF implementation via IMM in an XML file providing this way the complete AMF information model.

Inputs

The first group of inputs described are from the entity types 404 subset. A component service type is a set as described by $cst=\{att_i; 0<=i<|cst|, \text{any number of attributes}\}$.

All component service types compose the set $CST=\{cst_i; 0<=i<|CST|\}$.

A component capability, which is used in describing a component type, is described by a tuple of
csCapability=<cst, compCap, maxAct, maxStdb>, where cst ∈ CST;

$$compCap = \begin{cases} x\_active\_and\_y\_standby \\ x\_active\_or\_y\_standby \\ 1\_active\_or\_y\_standby \\ 1\_active\_or\_1\_standby \\ x\_active \\ 1\_active \end{cases}$$

$$maxAct = \begin{cases} x\_active\_and\_y\_standby \Rightarrow x, x \geq 1 \\ x\_active\_or\_y\_standby \Rightarrow x, x \geq 2 \\ 1\_active\_or\_y\_standby \Rightarrow 1 \\ 1\_active\_or\_1\_standby \Rightarrow 1 \\ x\_active \Rightarrow x, x \geq 2 \\ 1\_active \Rightarrow 1 \end{cases}$$

$$maxStdb = \begin{cases} x\_active\_and\_y\_standby \Rightarrow y, y \geq 1 \\ x\_active\_or\_y\_standby \Rightarrow y, y \geq 1 \\ 1\_active\_or\_y\_standby \Rightarrow y, y \geq 2 \\ 1\_active\_or\_1\_standby \Rightarrow 1 \\ x\_active \Rightarrow 0 \\ 1\_active \Rightarrow 0 \end{cases}$$

A component type can be described as a set as follows.
ct={csCapability$_i$; 0<=i<|ct|, all the component service (CS) types provided by the component type ct}
All component types compose the set as described by
CT={ct$_i$; 0<=i<|CT|}.
A second type of inputs may belong either to the entity types 404 or to the services set/user input 406 subset.
A member CS type is a tuple as described by
memCst=<cst, maxCsi>, where cst ∈ CST;
maxCsi is the number of CSIs of type cst that a service instance of a particular type may contain.
A service type is a set
st={memCst$_i$; 0<=i<|st| component service instances that compose the service type st}.
All the service types compose the set
ST={st$_i$; 0<=i<|ST|}.
A third type of inputs may belong either to the entity types 404 or to the services set/user input 406 subset or completely omitted as an input. In this latter case the configuration generation is creating these types.
Service Unit Types
The services of a service unit type is a set as described by
sutServices={st$_i$; 0<=i<|sutServices|, all the service types the service unit provides and it is a subset of ST}.
A member component type is a tuple
memCt=<ct, maxComp>where ct ∈ CT;
maxComp is the maximum number of instances of this component type an SU of this type may contain.
The component types of an SU type is a set
sutCt={memCt$_i$; 0<=i<|sutCt|, all the component types the service unit may contain and |sutCt|<=|CT|}.
A service unit type is a tuple
sut=<sutCt, sutServices>
All the service unit type compose the set
SUT={sut$_i$; 0<=i<|SUT|}

This set may be empty (SUT={ }) at the beginning of the configuration generation.
Service Group Types
The service unit types of a service group type is a set as described by sgtSut={sut$_i$; 0<=i<|sgtSut|, all the service unit types the service group may contain and it is a subset of SUT}
A service group type is a tuple
sgt=<sgtSut, redMod>, where $$redMod = \begin{cases} 2n \\ nplusm \\ nway \\ nwayactive \\ noredundancy \end{cases}$$

All service group types compose the set
SGT={sgt$_i$; 0<=i<|SGT|}
This set may be empty (SGT={ }) at the beginning of the configuration generation.
A fourth type of inputs is the services set/user input 406 which, as described according to exemplary embodiments above, includes Service Instance templates for the service instances and Component Service Instance templates for their component service instances that need to be protected by Service Groups. Pseudo-code for a variety of services set/user input 406 is shown below.
CSI Templates
A CSI template is a tuple
csiTemp=<cst, numCsi>, where cst ∈ CST;
numCsi is the number of CSIs of type cst created based on this template.
All CSI templates compose the set
CSIT={csiTemp$_i$; 0<=i<|CSIT|}.
SI Templates
A SI template is a tuple
siTemp=<st, sicsTemps, redMod, numSIs, numAct, numStdb, numSUs>,
where
st ∈ ST;
sicsiTemps={csiTemp$_i$;                           0<=i<|sicsiTemps|
∀csiTemp$_i$.cst≡st$_i$.cst                      and
csiTemp$_i$.numCsi≦st$_i$.maxCsi};
numSIs is the number of SI that is created using this template $$numAct = \begin{cases} redMod \neq nwayactive \Rightarrow 1 \\ x; x \geq 2, \end{cases}$$

is the number of HA active assignments per SI;

$$numStdb = \begin{cases} redMod \equiv nway \Rightarrow y; y \geq 1 \\ redMod \equiv nwayactive \Rightarrow 0 \\ redMod \equiv noredundancy \Rightarrow 0 \\ 1, \end{cases}$$

is the number of HA standby assignments per SI;
numSUs=<sus, susAct, susStdb, susSpare>, where
sus the total number of SUs in the SG protecting the SIs generated from this template; sus>=susAct+susStdb+susSpare;

$$numAct = \begin{cases} redMod \equiv nplusm \Rightarrow z \\ redMod \equiv nwayactive \Rightarrow z; z > 1 \\ redMod \equiv noredundancy \Rightarrow numSIs \\ redMod \equiv 2n \Rightarrow 1 \\ redMod \equiv nway \Rightarrow 0, \end{cases}$$

is the number of SUs that can have only active assignments;

$$susStbd\ numStdb = \begin{cases} redMod \equiv nplusm \Rightarrow w \\ redMod \equiv nwayactive \Rightarrow 0 \\ redMod \equiv noredundancy \Rightarrow 0 \\ redMod \equiv 2n \Rightarrow 1 \\ redMod \equiv nway \Rightarrow 0 \end{cases}$$

is the number of SUs that can have only standby assignments;
susSpare is the number of spare SUs.
All SI templates compose the set
SIT={siTemp$_i$; 0<=i<|SIT|}.

The final type of input is the number of nodes. Number of nodes can be an optional separate input, or defined elsewhere, e.g., read from the system for which the configuration is being generated. The number of nodes can be described using pseudo-code as a node template as follows. Each node template characterizes a distinct set of nodes that share characteristics. Currently only one template is used that represents all the nodes of the cluster.
The node template is a tuple
nodeTemp=<numNodes>, where
numNodes is the number of nodes created based on the template.
All node templates compose the set
NodeTemp={nodeTemp$_i$; 0<=i<|NodeTemp|}.

Outputs are a result of processing by the AMF Configuration Generator 402 to be used in the final configuration file. The pseudo-code used to describe and generate these Outputs is described below.
Outputs
Components
A component has a name and belongs to component type. It is a tuple coop=<safComp, ct>, where ct $\in$ CT;
safComp is a tuple safComp=<safSu, rdn>, where
safSu is a SAF compliant LDAP distinguished name of the SU the component belongs to and
rdn is a relative distinguished name of the component, which is unique within the SU.
Service Units
A service unit is a tuple
su=<safSu, sut, memComps>, where
safSu is a tuple safSu=<safSg, rdn>, where
safSg is a SAF compliant LDAP distinguished name of the SG the service unit belongs to and
rdn is a relative distinguished name of the SU which is unique within the SG; sut $\in$ SUT;
memComps={memComp$_i$;          0<=i<|memComps|, $\forall$memComp.safComp.safSu==safSu;}
memComp={ } at the start of the configuration generation.
Service Groups
A service group is a tuple
sg=<safSg, sgt, memSus, nodeGroup>, where
safSg is a tuple safSg=<safApp, rdn>, where
safApp is a SAF compliant LDAP distinguished name of the application the service group belongs to, and
rdn is a relative distinguished name of the SG, which is unique within the application; sgt $\in$ SGT;
memSus={memSu$_i$; 0<=i<|memSus|, memSu$_i$.sut $\in$ sgt.sgt-Sut and $\forall$ memSu.safSu.safSg==safSg;}
memSUs={ } at the start of the configuration generation
nodeGroup={node$_i$; 0<=i<|nodeGroup|,}; the nodeGroup $\subseteq$ Cluster on which the SG is distributed.
Component Service Instances
A component service instance is a tuple
csi=<safCsi, cst, attrValues>, where
safCsi is a tuple safCsi=<safSi, rdn>, where
safSi is a SAF compliant LDAP distinguished name of the service instance the component service instance belongs to, and
rdn is a relative distinguished name of the CSI, which is unique within the service instance;
cst $\in$ CST;
attrValues={attrValue$_i$; 0<=i<|cst|}
attrValue=<attr, value>, where
$\forall$attrValue.attr $\in$ cst.attr;
attrValue.value is a value set for the attribute
attrValues={ } the method does not currently include the generation of attribute values.
Service Instances
A service instance is a tuple
si=<safSi, st, sg, memCsis>, where
safSi is a tuple safSi=<safApp, rdn>, where
safApp is a SAF compliant LDAP distinguished name of the application the service instance belongs to, and
rdn is a relative distinguished name of the Si, which is unique within the application;
st $\in$ ST;
memCsis={memCsi$_i$;  0<=i<|memCsis|,  $\forall$memCsi.cst$\Rightarrow$ st.cst; and $\forall$memCsi.safCsi.safSi==safSi;}
memCsis={ } at the start of the configuration generation
sgSis={si$_i$; 0<=i<|sgSis|, $\forall$si$_i$.sg==sg} the set of SIs protected by the same service group, they specify the same service group.
Application
The application for which the configuration is generated is a tuple
app=<safApp, memSgs, memSis>, where
safApp is a distinguished name of the application;
memSgs={memSg$_i$;          0<=i<|memSgs|, $\forall$memSg.safSg.safApp==safApp;} memSgs={ } at the start of the configuration generation.
memSis={memSi$_i$;          0<=i<|memSis|, $\forall$memSi.safSi.safApp==safApp;}
memSis={ } at the start of the configuration generation.
Nodes
node=<safAmfNode, hostedSus>, where
safAmfNode is a distinguished name of the node;
hostedSus={hostedSu$_i$; 0<=i<|hostedSus|}
hostedSus={ } at the start of the configuration generation.
All nodes compose the cluster:
Cluster={node$_i$; 0<=i<|Cluster|}
findCompType Method
Input
   sut, the service unit type within which the search is performed, it may be empty
   cst, the component service type that needs to be provided
   redMod, the redundancy model within which cst is provided Output chosenCompType, the selected component type Functional Description The find CompType method selects the component type within the service unit type or among all component types that can provide the highest utilization for the given redundancy model.

validCompTypes is the set of component types that can provide a required component service type cst within the service unit type sut or among all the component types:

$$validCompTypes = \left\{ vct_i; \begin{cases} sut \neq \{\} \Rightarrow \forall\, sut.sutCt_j.csCapability_k.cst \equiv \\ \qquad cst \Rightarrow vct_i \\ sut \equiv \{\} \forall\, ct_j.csCapability.cst \equiv cst \Rightarrow vct_i, \end{cases} \right.$$

$$ct_i \in CT.$$

```
begin
  MaxMin = 0
  chosenCompType = { }
  i = 0
  while (i < |validCompTypes|) // for each valid component type vct
  begin
    j = 0
    while (j < |vct_i.csCapability|) // for each CS type it provides
    begin
      if redMod == 2n OR redMod == nplusm
        Min = min(vct_i.csCapability_j.maxAct,
                  vct_i.csCapability_j.maxStandby)
      if redMod == nway
        // x_active_and_y_stanby is the mandatory capability
        // for nway
        if vct_i.csCapability_j == x_active_and_y_standby
          Min=min(vct_i.csCapability_j.maxAct,
                  vct_i.csCapability_j.maxStandby)
        else
          Min = 0 // cannot be used for nway
      if redMod == nwayactive OR redMod == noredundancy
        Min= vct_i.csCapability_j.maxAct
      if Min > 0 AND Min > MaxMin
      begin
        MaxMin = Min
        chosenCompType = ct_i
      end
      j = j + 1
    end
    i = i + 1
  end
  if chosenCompType == { }
    return cst cannot be provided
  else
    return chosenCompType
end
``` suActCap Methods

Input siTemp, an SI template

Output suActCap, the required active capability for the SU type or an SU with respect to the Si template Functional Description The required SU active capabilities are calculated with respect to the SI template with the assumption that an SU provides a group of SIs from a single template. In the formula ceil( ) is used to round up to the nearest integer.

return $$suActCap = \begin{cases} redMod \equiv nway \Rightarrow \mathrm{ceil}\left(\dfrac{siTemp.numSIs}{siTemp.numSUs.sus - siTemp.numSUs.susSpare}\right) \\ redMod \equiv nwayactive \Rightarrow \mathrm{ceil}\left(\dfrac{siTemp.numSIs \times siTemp.numAct}{siTemp.numSUs.susAct}\right) \\ redMod \equiv noredundancy \Rightarrow siTemp.numSIs \\ redMod \equiv 2n \Rightarrow siTemp.numSIs \\ redMod \equiv nplusm \Rightarrow \mathrm{ceil}\left(\dfrac{siTemp.numSIs}{siTemp.numSUs.susAct}\right) \end{cases}$$

suStdbCap Methods

Input siTemp, an Si template

Output suStdbCap, the required standby capability for the SU type or an SU with respect to the SI template Function Description The required SU standby capabilities are calculated with respect to the SI template with the assumption that an SU provides a group of SIs from a single template. In the formula ceil( ) is used to round up to the nearest integer.

return $$suStdbCap = \begin{cases} redMod \equiv nway \Rightarrow \mathrm{ceil}\left(\dfrac{siTemp.numSIs \times siTemp.numStdb}{siTemp.numSUs.sus - siTemp.numSUs.susSpare}\right) \\ redMod \equiv nwayactive \Rightarrow 0 \\ redMod \equiv noredundancy \Rightarrow 0 \\ redMod \equiv 2n \Rightarrow siTemp.numSIs \\ redMod \equiv nplusm \Rightarrow \mathrm{ceil}\left(\dfrac{siTemp.numSIs}{siTemp.numSUs.susAct}\right) \end{cases}$$

findSUType Method

Input siTemp, an Si template

Output chosenSuType, the selected service unit type

Functional Description

This function searches for the first SU type that can provide the SIs of the given template siTemp. Optimization may be added depending on other requirements.

validSuTypes is the set of service unit types that can provide the required service type siTemp.st among all the service unit types:

$$validSuTypes =$$

$$\left\{ vsut_i; SUT \neq \{\} \begin{cases} siTemp.redMod \neq nway \Rightarrow \forall\, sut_j.st \equiv \\ \qquad siTemp.st \Rightarrow vsut_i \\ siTemp.redMod \equiv nway \Rightarrow \\ \qquad \Rightarrow \forall\, sut_j.memCt.csCapability.compCap \equiv \\ \qquad x\_active\_and\_y\_standby \wedge \\ \wedge \forall\, sut_j.st \equiv siTemp.st \Rightarrow vsut_i \end{cases} \right.$$

$$sut_j \in SUT;$$

It may be an empty, set in which case a new SU type is created if it is permitted by limited.

```
begin
  chosenSuType = { }
  if validSuTypes ≠ { }
  begin
    i = 0
    while(i < |validSUTypes|) // find an SU type that
    begin
      j = 0
      while(j < |siTemp.sicsiTemp|) // supports all CSI templates
      begin
        // use findCompType to find an appropriate component
        if
NOT(
∃k,l ⇒ siTemp.csiTemp$_j$.cst ≡ vsut$_i$.memCt$_k$.csCapability$_l$.cst
)
          j = j + |siTemp.sicsiTemp|
                // make it break by being too big
        else
          if ((vsut$_i$.memCt$_k$.csCapability$_l$.maxAct x
              x vsut$_i$.memCt$_k$.csCapability$_l$.maxComp) <
              < (siTemp.csiTemp$_j$.numCsi x
                  suActCap(siTemp))) OR
            ((vsut$_i$.memCt$_k$.csCapability$_l$.maxStdb
              x vsut$_i$.memCt$_k$.csCapability$_l$.maxComp) <
              < (siTemp.csiTemp$_j$.numCsi x
                  suStdbCap(siTemp)))
            j = j + |siTemp.sicsiTemp|
                // make it break by being too big
          j = j + 1
      end
      // next condition is only true if break occurred,
      // if so go for next SU type
      if j > |siTemp.sicsiTemp|
        i = i + 1
      else
      begin
        chosenSuType = vsut$_i$
        return chosenSuType
              // returns the first appropriate SU type
      end
    end
  end
  if chosenSuType == { }
      // if nothing is found or no valid SU types
  begin
    chosenSuType = <{ }, siTemp.st> // create a new SU type
    i = 0
    while(i < |siTemp.sicsiTemp|)
          // that supports all CSI templates
    begin
      vct = { }
      vct = findCompType(chosenSuType,
          siTemp.csiTemp$_i$.cst,siTemp.redMod)
      if vct == { }
        return { } // cst cannot be provided
      if vct ∉ sut.sutCt
        chosenSuType.sutCt =
            chosenSuType.sutCt ∪ {<vct, NoLimit>}
      i = i + 1
    end
    SUT = SUT ∪ { chosenSuType }
    return chosenSuType
  end
end
``` findSGType Method
Input
  sut, an SU type
  redMod the required redundancy model
Output
  chosenSgType, the selected service group type
Functional Description
  This function searches for the first SG type that can protect the SIs using the requested service unit type sut according to the requested redundancy model redMod. Optimization may be added depending on other requirements.

```
begin
  chosenSgType = { }
  i = 0
  while(i < |SGT|)
  begin
    // the SG type allows for the SU type and the redundancy
    model
    if sgt$_i$.redMod == redMod AND ∃k ⇒ sgt$_i$.sut$_k$ ≡ sut
    begin
      chosenSgType = sgt$_i$
      return chosenSgType
    end
    i = i + 1
  end
  if chosenSgType == { }
  begin
    chosenSgType = <sut, redMod>
    SGT = SGT ∪ { chosenSgType }
    return chosenSgType
  end
end
``` createSis Method
Input
  siTemp, an SI template for which the SIs are being generated
  sg, the sg that shall protect this set of SIs
Output
  sgSis, the set of service instances protected by a service group
Functional Description
  Based on the provided SI template, this method generates all the service instances and their component service instances that shall be protected by a service group Currently this function does not include the generation of CSI attributes.

```
begin
  sgSis = { }
  i = 0
  while(i < |siTemp.numSIs|)
  begin
    si = <"safSi=...", siTemp.st, sg, { } >
    j = 0
    while (j < |siTemp.sicsiTemps|) // for each CS type in the SI
    begin
      k = 0
      while (k < |siTemp.csiTemp$_j$.numCsi|)
      // create the specified number of CSIs
      begin
        si.memCsis = si.memCsis ∪ {<"safCsi=...",
                            siTemp.csiTemp$_j$.cst, { } >}
        k = k + 1
      end
      j = j + 1
    end
    sgSis = sgSis ∪ {si}
    i = i + 1
  end
  return sgSis
end
```

Final configuration generation will now be described using the pseudo-code as described below.
generateConf Method
Input
  CT all component types
  CST all component service types
  ST all service types SIT all service instance templates
CSIT all component service instance templates
SUT service unit types, may be empty
SGT service group types, may be empty
nodeTemp the node template
userPreference is a set of preferences that guides the configuration generation. They allow for different options and optimization and can be extended accordingly. The pseudo-code does not reflect them.

Output
AMF entities for a single application distributed on the nodes of a cluster, i.e. app=<safApp, memSgs, memSis>. Since the application refers to the SG set and the SI set, and they all refer to their children in turn, only the application itself is defined in this example as an output. This "app" is thus a tree with all the instances according to the Output section.

Functional Description
This is the main function which, after determining the required entity types using the findSUType and findSGType methods, populates the configuration with all the instances listed as outputs. It also distributes the generated service units on the nodes.

```
begin
    app = < "safApp=. . .", { }, {} > // create an application instance
of the output
    i = 0
    m = 0
    while(i < |SIT|) // for each SI template
    begin
        sut = { }
        sut = findSUType(siTemp_i) // find appropriate SU type
        if sut == { }
            return // no configuration can be generated
        sgt = { }
        sgt = findSGType(sut, siTemp_i.redMod)
            // find appropriate SG type
        sg = <"safSg=. . .", sgt, { }, {},{} >
            // a first SG instance of the output set is created
        app.memSis = createSis(siTemp_i, sg)
            // create the protected SIs instances and assigned
            // them to that SG instance
            // create first SU in the SG
        su = < "safSu=. . .", sut, { } >
        sg.memSus = sg.memSus U {su}
        sg;nodeGroup = sg.nodeGroup U {node_m}
        node_m.hostedSus = node_m.hostedSus U {su}
        m = (m + 1) mod |Cluster|
        j = 0
        ct_set = { } // component types in use
        su_act = suActCap(siTemp_i)
        su_stdb = suStdbCap(siTemp_i)
        while(j < |siTemp_j.sicsiTemps|) // for all CS types
        begin
```

$$ct = \text{findComType}(sut, siTemp_i.csiTemp_j.cst, siTemp_i.redMod)$$

$$N = \max\left(\text{ceil}\left(\frac{su\_act \times siTemp_i.csiTemp_j.numCsi}{ct.csCapability.maxAct}\right),\right.$$
$$\left.\text{ceil}\left(\frac{su\_act \times siTemp_i.csiTemp_j.numCsi}{ct.csCapability.maxStdb}\right)\right)$$

```
            mem_ct = <ct, N>
                // number of instances of a component type
            if mem_ct ∉ ct_set
            begin
                ct_set = ct_set U {mem_ct}
                    // remember the number of instances
                k = 0
                while (k < N)
                    // create the needed number of components
```

```
                begin
                    su.memComps =
                        su.memComps U {<"safComp =. . .", ct >}
                    //components are created and added to the first SU
                        k = k + 1
                    end
                end
            else
            begin
                // find how many components are now in the SU
                ∃l ⇒ mem_ct_l.ct = ct, mem_ct_l ∈ ct_set
                If mem_ct_l.N < N // if not enough
                begin
                    k = 0
                    while (k < N - mem_ct_l.N)
                        // create the needed number of components
                    begin
                        su.memComps = su.memComps U
                            {<"safComp = . . .", ct >}
                        k = k + 1
                    end
                    mem_ct_l.N = N
                end
            end
            j = j + 1
        end
        k = 1
        while (k < siTemp_i.numSus.sus)
            // clone the needed number of SUs
        begin
            new_su = < "safSu= . . .", su.sut, su.memComps>
            sg.memSus = su.memSus U {new_su}
            //second, third etc. SUs are created and added to the SG
            k = k + 1
            sg.nodeGroup = sg.nodeGroup U {node_m}
            node_m.hostedSus = node_m.hostedSus U {su}
            m = (m + 1) mod |Cluster|
        end
        app.memSgs = app.memSgs U {sg}
            //the SG is added to the application
        i = i + 1
    end
end
```

Figure 10:
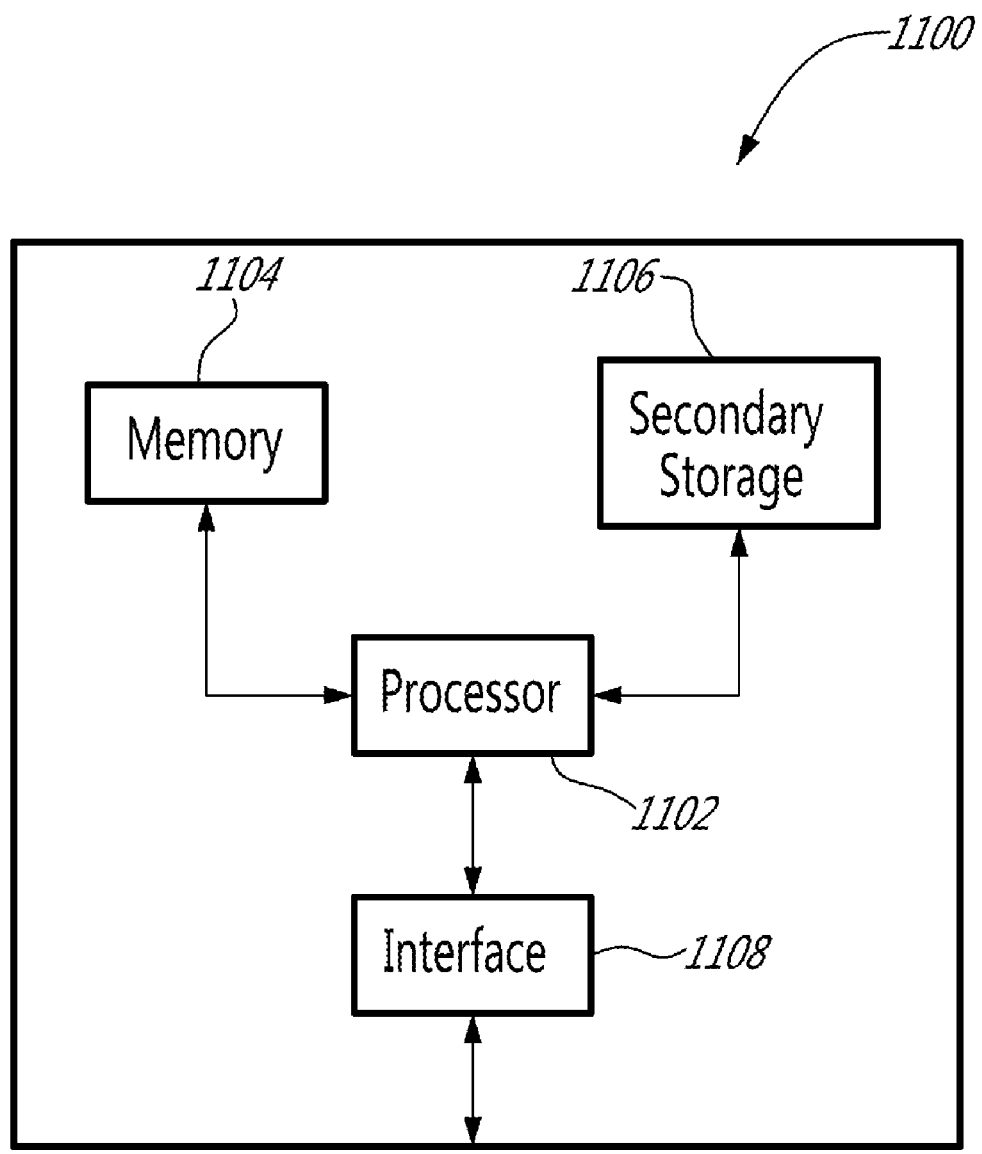
FIG. 10 depicts a configuration generator node according to exemplary embodiments;.

The exemplary embodiments described above provide methods and systems for generating an output of code for an IMM XML file 412 by an AMF Configuration Generator 402 for use by an AMF via IMM, typically in a HA environment. An exemplary node 1100 which can act as an AMF Configuration Generator 402 will now be described with respect to FIG. 10. Node 1100 can contain a processor 1102 (or multiple processor cores), memory 1104, one or more secondary storage devices 1106 and an interface unit 1108 to facilitate communications between node 1100 and the rest of the network, i.e., sources of input and receiver of the output. Additionally, the node 1100 can contain control instructions for automating the generation of the system model based upon received inputs. The memory (or the secondary storage) can be used for storage of exemplary inputs such as user inputs or known required entity types 404 as defined by current AMF standards. Thus, a node 1100 according to an exemplary embodiment may include a processor for generating a system model according to the format of an IMM XML schema for future (or current) use by an AMF.

Figure 11:
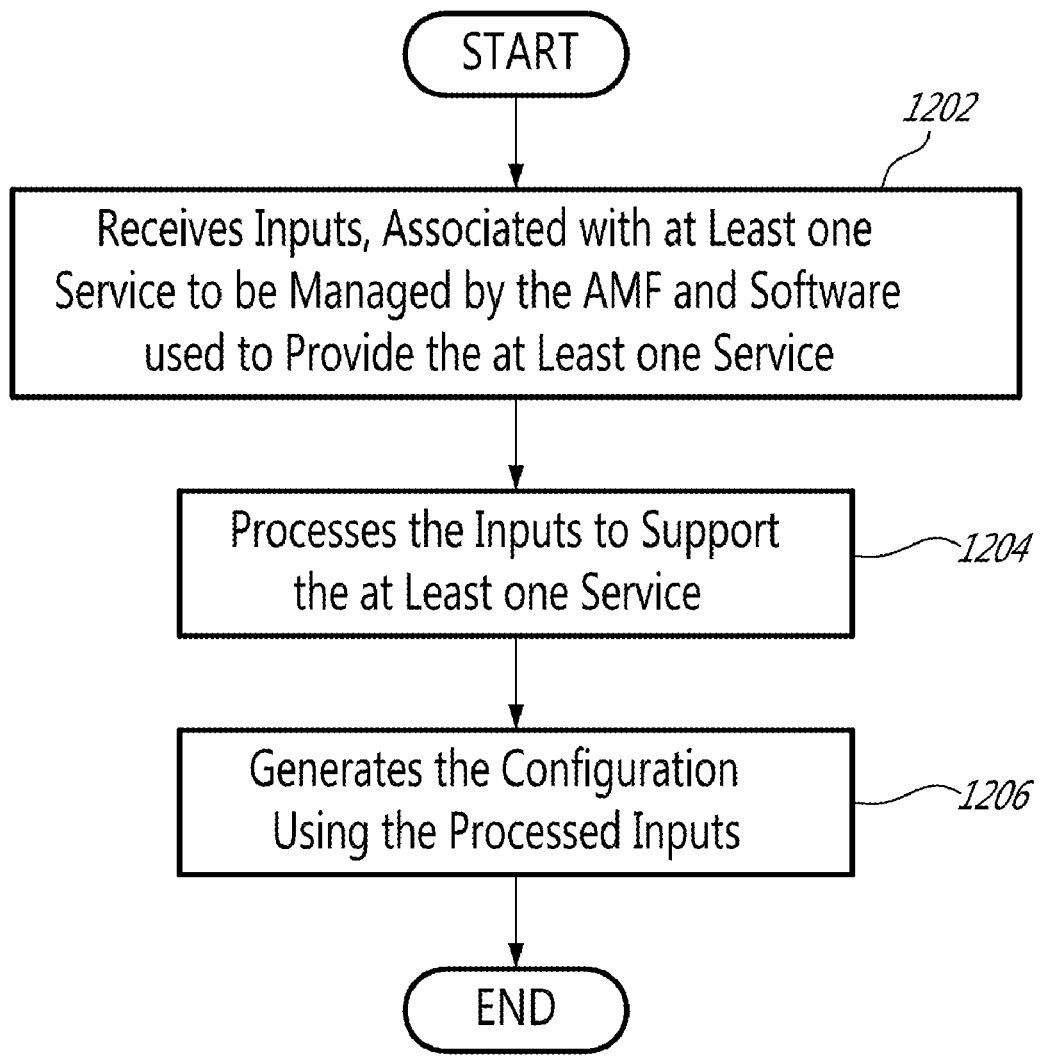
FIG. 11 shows a flowchart for creating an AMF configuration file according to exemplary embodiments.

Utilizing the above-described exemplary systems according to exemplary embodiments, a method for generating a configuration file is shown in the flowchart of FIG. 11. Initially a node receives inputs, associated with at least one service to be managed by the AMF and software used to provide the at least one service in step 1202. The node then processes the inputs to support the at least one service in step 1204. The node then generates a configuration using the processed inputs in step 1206, if possible. It will be appreciated that it is possible that no configuration can be generated if, for example, the required services cannot be provided by the system or software with the desired level of protection (redundancy).

It will be appreciated that the foregoing exemplary embodiments are merely illustrative and that numerous variations and permutations thereof are within the scope of this document. For example, although the configuration generated by these exemplary embodiments is described as an IMM XML, it will be appreciated by those skilled in the art that this is the input format for IMM, and not necessarily that which is provided directly to an AMF implementation. An AMF implementation may instead have other, non-standard input formats. The configuration which is generated by these exemplary embodiments may be presented in such format(s).

Top Down Approach

The foregoing exemplary embodiments describe systems, methods, devices and software for generating an AMF configuration based on, for example, user requirements and entity types provided by the vendor. Some of these exemplary embodiments employ a "bottom up" approach for selecting an SU type and component type as part of the AMF configuration generation process. That is, some of these exemplary embodiments search for a suitable SU type and component type set in an entities type file 404 based on the inputs which are provided to the configuration process and then generate compatible higher level type(s), e.g., an SG type, as part of the AMF configuration generation process. However, according to another exemplary embodiment described below, it may first be useful to look at the constraints (if any) associated with the higher level types in the input entity types file 404 as part of the search for a suitable SU type and component type in order to avoid generating unnecessary higher level types and/or higher level types which are inconsistent with such constraints.

Figure 12:
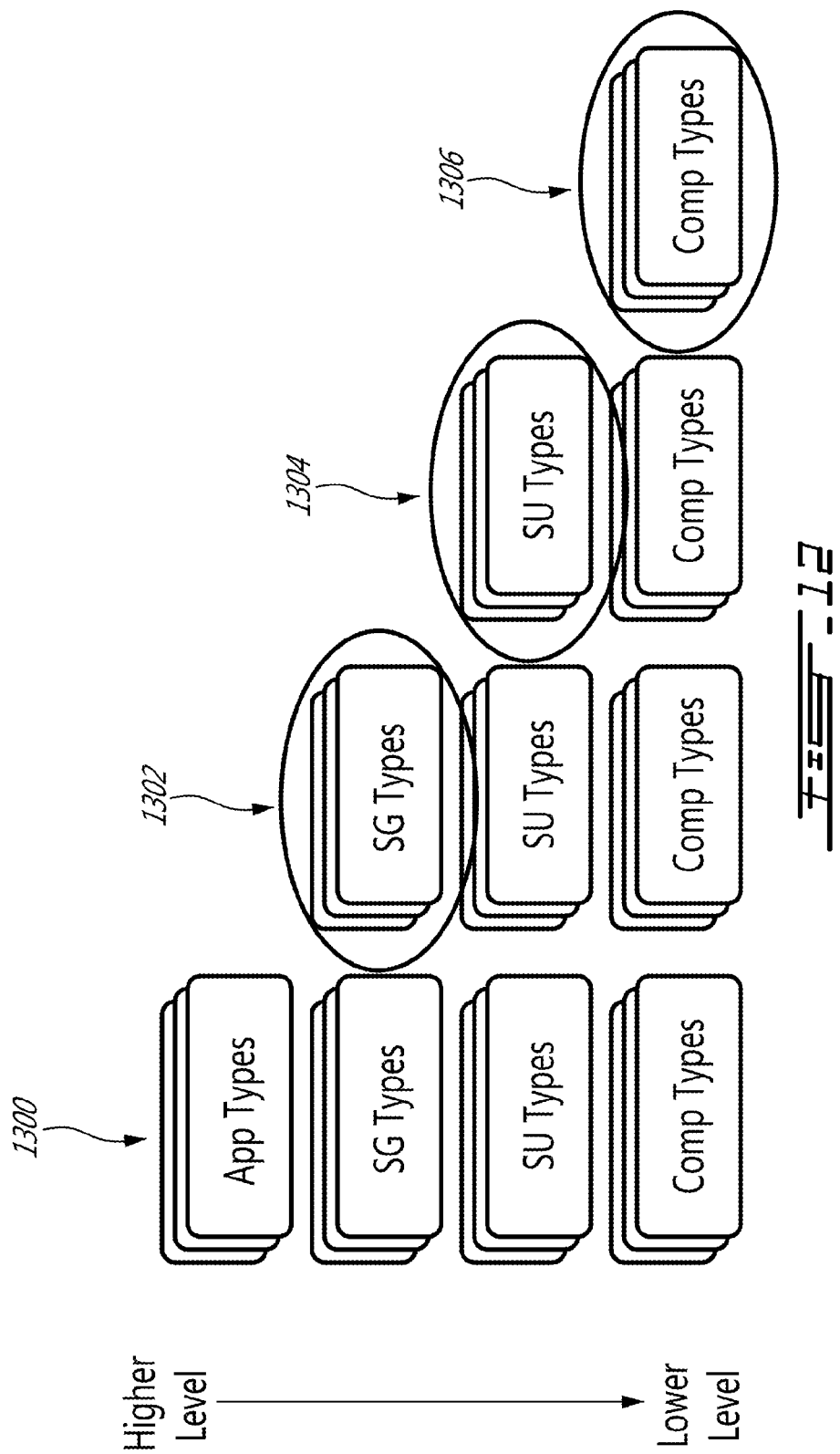
FIG. 12 conceptually illustrates an entity types file including orphan types according to an exemplary embodiment.

Consider, for example, the conceptual view of an entity types file 404 illustrated as FIG. 12 which has been input to an AMF configuration generation process according to this exemplary embodiment. Therein, the entity types file 404 from, e.g., a vendor, has specified one complete group of types, e.g., an app type, an SG type, an SU type and a component type represented by column 1300 (each of which may have several instances associated therewith). The remaining types, e.g., represented by columns 1302, 1304 and 1306 are incompletely specified in the entity types file 404. The circled types in these columns are referred to herein as "orphaned" types because they are not supported by higher level types in the entity types file 404.

Figure 13:
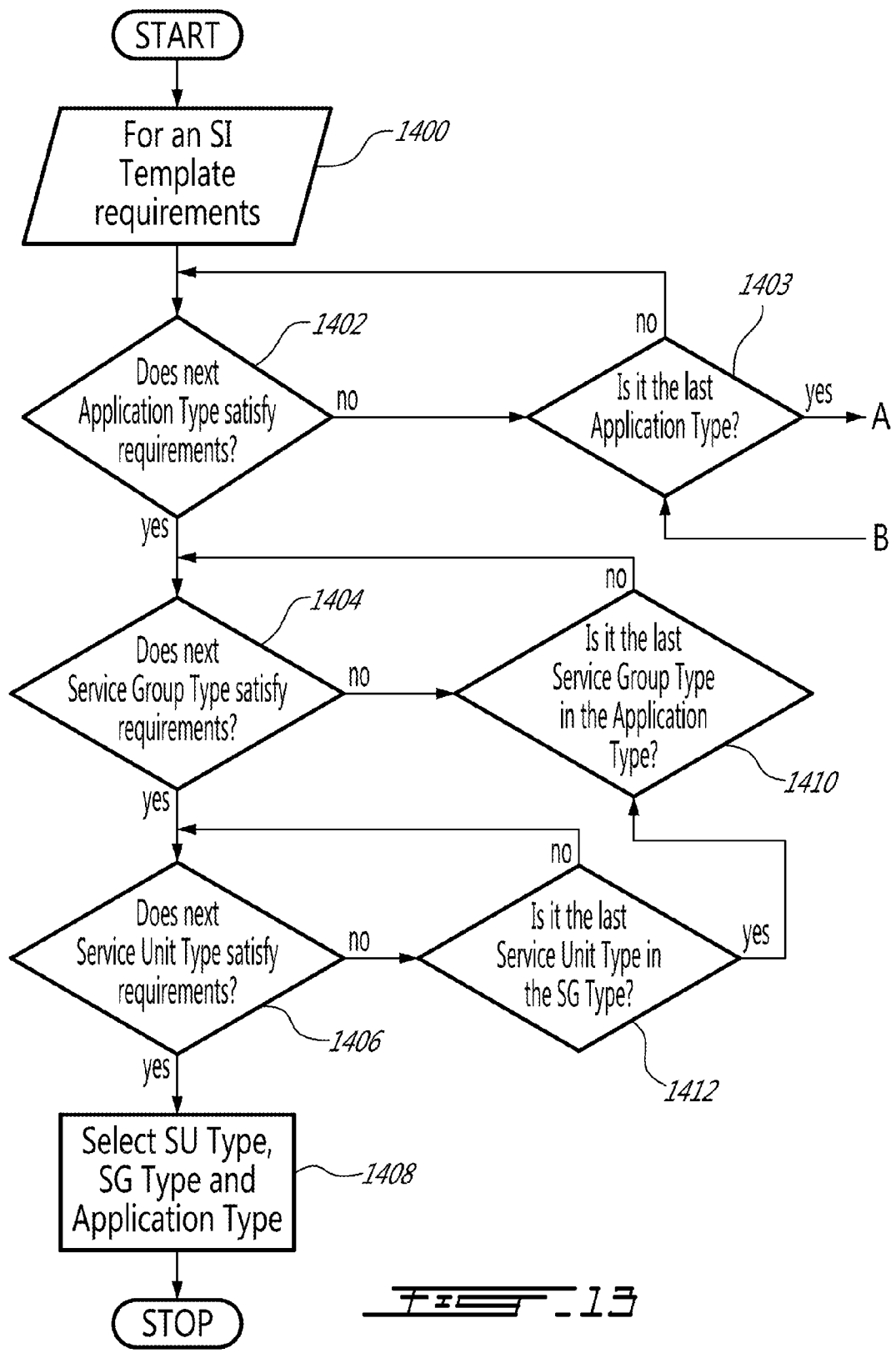
FIG. 13 is a flowchart illustrating a method according to an exemplary embodiment.

According to this exemplary embodiment, searching for a service unit type and a component type to support a service can be performed in an order which involves first evaluating those groups of types which are more fully specified and then evaluating those groups of types which are less fully specified. This enables, for example, such a search to consider the constraints which may be provided by the vendor for the higher level types and/or to avoid creating higher level types when a service may be supported by a service unit type and component type which are already supported by higher level types. In this context, such restrictions or constraints may include, for example, one or more of: relations between types, limitations, capabilities dependencies, or other constraints. An example of such a constraint is a redundancy type associated with the SG type. An example of a search process for selecting a service unit type and component type in support of a service according to an exemplary embodiment is illustrated in the flowchart of FIG. 13.

For a given set of service instance template requirements 1400, the process first evaluates an application type in an entity types file at step 1402 to determine whether that application type has a constraint which conflicts with one of the inputs to the configuration generation process, e.g., a user input requirement associated with redundancy. Stated differently, step 1402 evaluates the existing application type to determine whether it satisfies the requirements associated with this service instance template. Using, as an exemplary reference, the entity types file shown in FIG. 12, the application type in column 1300 could, for example, be evaluated initially at step 1402. If a conflict exists, then the flow follows the "No" path from block 1402 to select another application type from the entity types file at step 1403. Alternatively, if the first selected application type satisfies the requirements for this service instance template, then the flow moves on to step 1404, wherein a service group type associated with the first selected application type in column 1300 is checked to see if it meets the requirements. If so, then the flow moves down to the next lower level at step 1406 wherein a service unit type associated with that service group type is checked to see if it satisfies the requirements for this service. If so, then that SU type, SG type and application type are selected for this service instance template at step 1408. If, however, a conflict is detected at the service group type level or the service unit type level, then another entity type at the same level can be evaluated (if one exists in the entity types file) by following the "No" path from the respective decision blocks 1404 or 1406, and looping back through blocks 1410 or 1412.

If the AMF configuration generator according to this exemplary embodiment cannot find a set of SU type, SG type and application type among those in the entity types file which satisfy the requirements for this service template, then the flow exits the "Yes" path from block 1403 to consider the orphaned service group type(s) (if any) in the entity types file. For example, if the types associated with the application type in the column 1300 did not provide a suitable set of types for the service instance template of interest, then the process could move on to column 1302 which includes an orphan service group type. This orphan service group type is then evaluated at step 1414 to determine if it has a conflict with the requirements, e.g., related to redundancy. If not, then the flow moves on to step 1416 wherein one or more service unit types associated with this service group type are checked to see if they can satisfy the requirements. If a set of SU type and an orphan SG type from the entity types file satisfy the requirements for this service instance template, then those entity types are selected and an application type can be created at step 1418 to support the SU type and SG type.

If the orphan service group type satisfies the requirements for this service instance template, but the first checked service unit type does not, then other service unit types associated with this service group type (if any exist) may be evaluated by looping back to step 1416 through step 1420. If none of the service unit types associated with this orphan service group type satisfy the requirements, then the flow can follow the "Yes" path from decision block 1420 wherein other orphan service group types can then be evaluated, if any exist in this entity types file. Otherwise, if this is the last orphan service group type in this entity type file, then the flow can follow the "Yes" path from block 1422 to block 1424 wherein orphan service unit types are evaluated, e.g., the orphan service unit type shown in column 1304 of FIG. 12. If this (or another via the loop including step 1428) orphan service unit type fulfills the requirements associated with the service instance template 1400, then that orphan service unit type is selected in step 1426 and an SG type and application type are created to support that SU type.

Otherwise, if no orphan service unit types satisfy the requirements imposed by the service instance template 1400, then the flow follows the "Yes" branch from step 1428 to step 1430. Therein, it can be checked to see whether a suitable service unit type can be constructed from orphan component types. If so, then a supporting SU type, SG type and application type are created at step 1432. If not, then the service instance template cannot be satisfied at step 1434 and the process terminates. Note that, in steps 1418, 1426 and 1432, new types may be created or existing types can be checked to see if they satisfy the SI requirements in which case they can "adopt" the orphaned type which is being selected.

Figure 14:
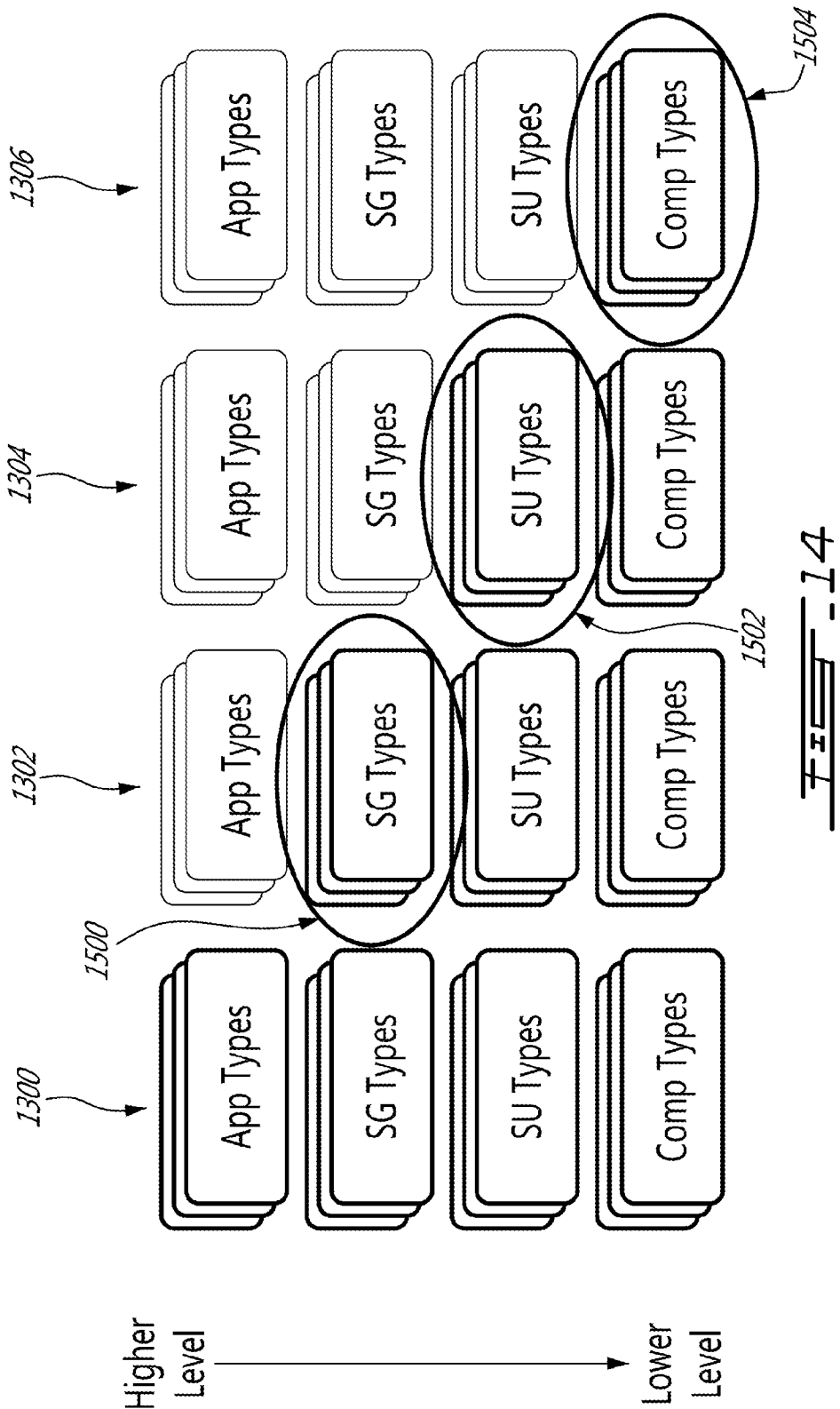
FIG. 14 conceptually illustrates an entity types file including orphan types and created types according to an exemplary embodiment.
Figure 18:
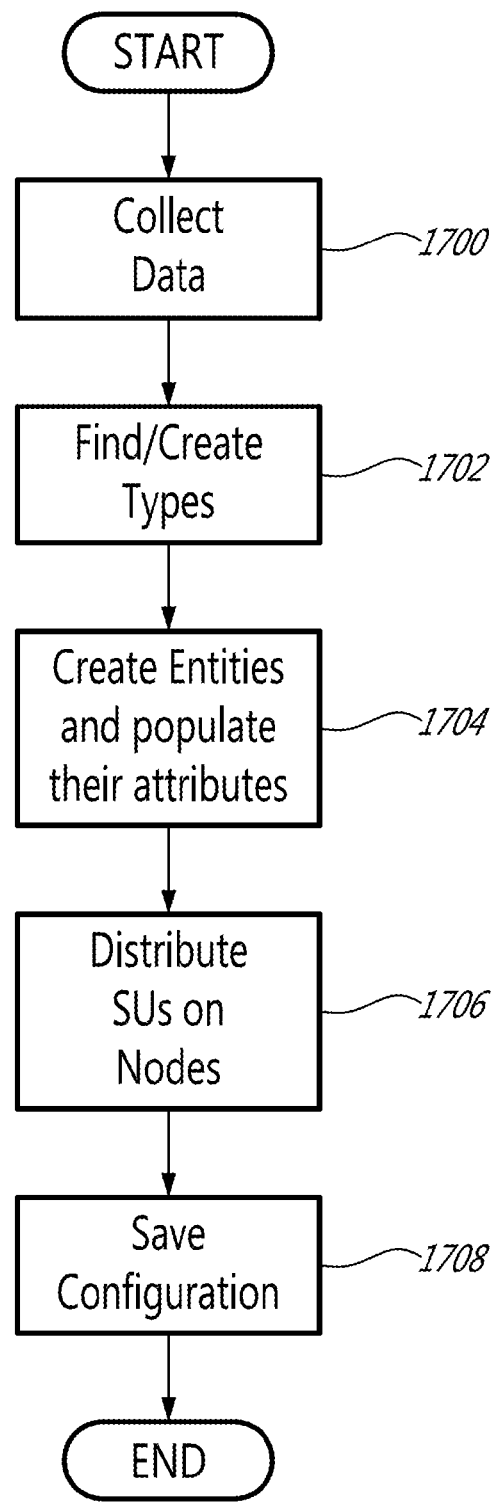

It should be appreciated that the particular order of search is not critical to these exemplary embodiments and, therefore, the SU types found in an entity types file may be evaluated in any desired order as part of the AMF configuration process. However, according to some exemplary embodiments, the AMF configuration generator tool may not be permitted to generate new instances of higher level types, e.g., App types and SG types, unless the SU type under consideration is an orphan, i.e., is not supported by the higher level types in an entities file. Thus, using again the exemplary entity types file 404 conceptually illustrated in FIG. 12, an AMF configuration tool according to one exemplary embodiment would be permitted to create the types illustrated above the circled, orphaned types in FIG. 14, but would not be permitted to create, e.g., another SG type in column 1300.

This latter possibility is exemplified in FIG. 15 wherein an AMF configuration generator (or a type finder portion 1600 thereof) according to this exemplary embodiment first searches for an appropriate SU type among the type groups which have higher level types in the entities file, e.g., as represented by rows 1300 and 1302 and the overlaid arrows therein, in the manner discussed above with respect to FIG. 13. The search is, as described above, based on the calculated parameters returned from calculator portion 1602, e.g., in a manner similar to that described above and in the exemplary pseudocode below. Having not found a suitable SU type in these type groups, the type finder 1600 then evaluates SU type 1604 and finds it to be suitable for supporting the service of interest. To support a new SU type 1604, the type creator portion 1606 of the AMF configuration generator then creates an App type and SG type in column 1304, e.g., in the manner described above with respect to the "bottom up" embodiments. All of these processes are described in more detail below.

Thus, an overall method for generating an AMF configuration according to this exemplary embodiment is illustrated in the flow diagram of FIG. 16. Each of these steps will be described in some detail. Therein, at step 1700, the data to be used in the configuration process is collected. Generally speaking, such inputs include two different parts, e.g., the entity types describing the software applications, and the set of services that the particular system should provide using this software. Regarding the entity types, these are typically provided by the software vendor as an XML entity types file. The XML schema for an entity types file is specified by the SAF SMF specification as described above. Accordingly, there are two mandatory entity types that the entity types file must contain for the software, i.e., the component types and the component service types they provide. Other entity types may also be provided, however these types do not have to be present in an entity types file if there are no restrictions or constraints related to them. On the other hand, an AMF configuration contains all of the entity types defined by AMF, therefore these higher level types are also one of the expected outputs of these exemplary embodiments. The entity types in the entity types file can be classified to find those types that are not referenced by any other type, i.e., the orphan types described above. More specifically, the orphan component types are not referenced by any service unit type, the orphan service unit types are not referenced by any service group type, and the orphan service group types are not referenced by any application type. As mentioned earlier, according to some exemplary embodiments, orphaned types have no limitations on how they are used with respect to, other higher level types whereas unorphaned types may be not be permitted to have higher level types created therefor.

The second part of the inputs which are collected at step 1700 are the services that the site will provide for which the AMF configuration is being created. As mentioned above, the AMF specification defines the services as a set of service instances in which each service instance is described by a set of component service instances. This is site specific information and will be entered into the AMF configuration generation tool according to exemplary embodiments by a user, e.g., a site designer. To ease this task this exemplary embodiment provides for service instance (SI) templates that characterize sets of service instances which are similar and that shall be protected in a similar manner. Therefore each template specifies a set of SIs that are protected by service groups (SG) of the same type. Within each service instance template the participating component service instances (CSI) are also defined via templates. These CSIs are based on the component service types provided by the software, and indicate how many instances are necessary for the composition of a service instance. An SI template also defines, for example, to which service type it belongs, the desired redundancy model, the number of service instances based on this template and their grouping of SIs to service groups. Based on the set of the SI templates, the corresponding set of service instances and their component service instances is generated by this exemplary embodiment. This can be complemented, according to some exemplary embodiments, by a procedure which generates all of the service and component service instances with their exact attribute settings.

The configuration generator (e.g., the generateConf method in the pseudocode below) loops through the SI templates specified by the user. Returning to FIG. 16, for each SI template, the entity types that can provide the service instances are selected at step 1702, e.g., by finding them among the existing types and/or creating new types. The type selection step 1702 starts with matching an SI template with the entity types provided as input. According to this exemplary embodiment, first the service group types of the existing application types are checked, e.g., to determine if the redundancy model of the service group type matches the one required by the SI template. If it does, then the service unit types of this service group type are checked (e.g., using the findSut method in the pseudocode below) to determine if they can (a) provide the required service type and (b) support the load of SIs expected to be assigned to them. If both of these conditions are met then, according to this exemplary embodiment, the service unit type, the service group type and the parent application are chosen for the service instances of the SI template.

On the other hand, if none of service group types of any application type can provide the service, then the "orphan service group types" are checked in the same way as described above. However, since these service group types are not referenced by any application type, when a suitable service unit type is found, an application type needs to be created. To perform application type creation, the already created application types are checked to determine whether any of them has the service group type as a member or can be extended with that service group type (e.g., using the find-Appt method in the pseudocode below). If not, a new application type is created (e.g., using the createAppType method in the pseudocode below) and added to the set of created application types (createdAPPTs). If none of the orphan service group types can provide the service, then the "orphan service unit types" are checked in a similar way. Again, when a service unit type is found, a service group type is either created (e.g., using the createSgType method in the pseudocode below) or found (e.g., using the findSgt method in the pseudocode below to search the set of createdSGTs) among the already existing created service group types to adopt the orphan service unit type. If a new service group type needs be created (it is added to the set of created service group types createdSGTs), then the appropriate application type also needs to be found or created. If none of the orphan service unit types can provide the service, then a service unit type is created (e.g., using the createSuType in the pseudocode below), and then adopted by a found/created service group type, that in turn will be adopted by a found/created application type.

Once all of the appropriate entity types have been found for an SI template, this exemplary embodiment then generates the entities of these types (e.g., within the generateConf in the pseudocode below) that would provide the service instances needed to support the requested services at step 1704. That is the AMF configuration is populated so it can provide for both the active and the standby assignments of each service instance protected by each service group. This can be accomplished by creating one service unit with the required number of components so that it provides the required active and standby capabilities for all the component service instances. Once all of the components of the first SU have been added, other SUs required by the redundancy model are copied from this first SU. If more than one service group is required for the SI template, the first service group is copied until all service instances can be served. This exemplary embodiment assumes equal ranking for all of the service units within each service group. However the present invention is not so limited and, for example, a ranking procedure can be added to dictate an ordered handling of service units within the service groups. Additionally, the entity types may be refined or optimized by tailoring the parameters of the type instances to their use based on the created entity instances.

Since the AMF specification does not currently cover performance characteristics for entities, this exemplary embodiment assumes that each service unit of the configuration produces equal load and that each cluster node provides the same capacity, although it will be appreciated by those skilled in the art that the present invention is not so limited. As a result this exemplary embodiment distributes the SUs among the nodes, at step 1706 in FIG. 16, of the cluster by selecting, for each SU, the node that has the smallest load in terms of number of service units assigned and that has no SU (or a smallest number of) associated with the same SG that the current SU belongs to. These conditions can be implemented by, for example, performing a global round robin distribution of the SUs as they are being created. Moreover, this exemplary distribution method can be further optimized or enhanced, e.g., based on performance characteristics of the system by assuming different capacities for the different nodes and different load for the different service units and or service instances and/or based on the assumption of different failure scenarios to avoid overload situations when one or more SUs/nodes fail in the system. These additional conditions will result in a non-round robin distribution of the SUs on the nodes. The process associated with steps 1702, 1704 and 1706 continues until all of the SI templates are processed and the configuration is populated with entities to provide their service instances in the SAF system.

As a result of applying the method illustrated in FIG. 16, and described above, to the inputs, an AMF configuration is generated by this exemplary embodiment that specifies all of the instances for all of the entity types and their entities. The result can then be stored or saved, e.g., in a memory device or recordable medium, in any desired format as indicated by step 1708. For example, this output can be presented and/or stored in accordance with the AIS specifications as an XML file created according to the IMM schema, which contains the description of the instances as specified in the UML model of AMF. In this way, an SAF compliant AMF implementation can be provided with the information model of all of the entities which it needs to manage as an input. Due to the potential complexity of AMF managed systems, this provides an automated approach to a complex and error prone task.

The following pseudo-code describes, at a high level, an exemplary implementation of the afore-described exemplary embodiment. Other implementations are also possible.

Component Service Types
A component service type is a set
$cst=\{att_i; 0<=i<|cst|, \text{any number of attributes}\}$.
All component service types compose the set
$CST=\{cst_i; 0<=i<|CST|\}$.
This set is a mandatory input and remains constant. It is provided typically by the software vendor.

Component Types
A component capability is a tuple of
$csCapability=<cst, compCap, maxAct, maxStdb>$, where $cst \in CST$;

$$compCap = \begin{cases} x\_active\_and\_y\_standby \\ x\_active\_or\_y\_standby \\ 1\_active\_or\_y\_standby \\ 1\_active\_or\_1\_standby \\ x\_active \\ 1\_active \end{cases}$$

$$maxAct = \begin{cases} x\_active\_and\_y\_standby \Rightarrow x, x \geq 1 \\ x\_active\_or\_y\_standby \Rightarrow x, x \geq 2 \\ 1\_active\_or\_y\_standby \Rightarrow 1 \\ 1\_active\_or\_1\_standby \Rightarrow 1 \\ x\_active \Rightarrow x, x \geq 2 \\ 1\_active \Rightarrow 1 \end{cases}$$

$$maxStdb = \begin{cases} x\_active\_and\_y\_standby \Rightarrow y, y \geq 1 \\ x\_active\_or\_y\_standby \Rightarrow y, y \geq 1 \\ 1\_active\_or\_y\_standby \Rightarrow y, y \geq 2 \\ 1\_active\_or\_1\_standby \Rightarrow 1 \\ x\_active \Rightarrow 0 \\ 1\_active \Rightarrow 0 \end{cases}$$

A component type is a set
$ct=\{csCapability_i; 0<=i<|ct|, \text{all the component service types provided by the component type ct}\}$ Component Type Sets
All component types compose the set
$CT=\{ct_i; 0<=i<|CT|\}$.
This set is a mandatory input and remains constant. It is provided typically by the software vendor.
orphanCTs is the subset of component types that are not referenced by any SU type in the input set (orphanCTs $\subseteq$ CT). Note that even when they are adopted by created service unit types, orphan component types remain in the set of orphanCTs
  Service Types
A member CS type is a tuple
$memCst=<cst, maxCst>$, where cst $\in$ CST;
maxCsi is the number of CSIs of type cst that a service instance of a particular type may contain.
A service type is a set
$st=\{memCst_i; 0<=i<|st|$ component service instances that compose the service type st$\}$.
All the service types compose the set
$ST=\{st_i; 0<=i<|ST|\}$.
This set is a mandatory input and remains constant.
  Service Unit Types
The services of a service unit type is a set
$sutServices=\{st_i; 0<=i<|sutServices|$, all the service types the service unit provides and it is a subset of ST$\}$
A member component type is a tuple
$memCt=<ct, maxComp>$ where ct $\in$ CT;
maxComp is the maximum number of instances of this component type an SU of this type may contain.
The component types of an SU type is a set
$sutCt=\{memCt_i; 0<=i<|sutCt|$, all the component types the service unit may contain and $|sutct|<=|CT|\}$.
A service unit type is a tuple
$sut=<sutCt, sutServices>$
  Service Unit Type Sets
All the service unit type compose the set
$SUT=\{sut_i; 0<=i<|SUT|\}$
This set may be empty (SUT={ }) at the beginning of the configuration generation.
orphanSUTs is the subset of service unit types that are not referenced by any SG type in the input set (orphanSUTs $\subseteq$ SUT). Note that even when they are adopted by created service group types, they remain in the set of orphanSUTs
createdSUTs is initially an empty set (createdSUTs={ }). It is the collection of service unit types that are created during the process of generating a configuration. It is also a subset of the service unit types set (createdSUTs $\subseteq$ SUT).
  Service Group Types
The service unit types of a service group type is a set
$sgtSut=\{sut_i; 0<=i<|sgtSut|$, all the service unit types the service group may contain and it is a subset of SUT$\}$
A service group type is a tuple
$sgt=<sgtSut, redMod>$, where $$redMod = \begin{cases} 2n \\ nplusm \\ nway \\ nwayactive \\ noredundancy \end{cases}$$

Service Group Type Sets
All service group types compose the set
$SGT=\{sgt_i; 0<=i<|SGT|\}$ This set may be empty (SGT={ }) at the beginning of the configuration generation.
orphanSGTs is a collection of service group types that are not referenced by any SU type in the input set (orphanSGTs $\subseteq$ SGT). Note that even when they are adopted by created application types, they remain in the set of orphanSGTs.
createdSGTs is initially an empty set (createdSGTs={ }). It is the collection of service group types that are created during the process of generating a configuration. It is also a subset of the service group types set (createdSGTs $\subseteq$ SGT).
  Application Types
An application type is a set described by
$appt=\{sgt_i; 0<=i<|SGTs|$; all the service group types the application type may contain$\}$
  Application Type Sets
All application types compose the set
$APPT=\{appt_i; 0<=i<|APPT|\}$.
This set may be empty (APPT={ }) at the beginning of the configuration generation.
createdAPPTs is initially an empty set (createdAPPTs={ }). It is the collection of application types that are created and added to this set during the process of the configuration generation. It is a subset of the application types set (createdAPPTs $\subseteq$ APPT).
  CSI Templates
A CSI template is a tuple
$csiTemp=<cst, numCsi>$, where cst $\in$ CST;
numCsi is the number of CSIs of type cst created based on this template.
All CSI templates compose the set
$CSIT=\{csiTemp_i; 0<=i<|CSIT|\}$.
This set is a mandatory input and remains constant. It is provided by the site designer.
  SI Templates
A SI template is a tuple
$siTemp=<st, sicsTemps, redMod, numSIs, numAct, numStdb, numSUs>$, where st $\in$ ST;
$sicsiTemps=\{esiTemp_i;\ 0<=i<|sicsiTemps|$
  $\forall csiTemp_i.cst=sti_i.cst$ and
  $csiTemp_i.numCsi \leq st_i.maxCsi\}$;
numSIs is the number of SI that is created using this template $$numAct = \begin{cases} redMod \neq nwayactive \Rightarrow 1 \\ x; x \geq 2, \end{cases}$$

is the number of HA active assignments per SI;

$$numStdb = \begin{cases} redMod \equiv nway \Rightarrow y; y \geq 1 \\ redMod \equiv nwayactive \Rightarrow 0 \\ redMod \equiv noredundancy \Rightarrow 0 \\ 1, \end{cases}$$

is the number of HA standby assignments per SI;
$numSUs=<sus, susAct, susStdt, susSpare>$, where
sus the total number of SUs in the SG protecting the SIs generated from this template; sus=susAct+susStdb+susSpare;

$$numAct = \begin{cases} redMod \equiv nplusm \Rightarrow z \\ redMod \equiv nwayactive \Rightarrow z; z > 1 \\ redMod \equiv noredundancy \Rightarrow numSIs \\ redMod \equiv 2n \Rightarrow 1 \\ redMod \equiv nway \Rightarrow 0, \end{cases}$$

is the number of SUs that can have only active assignments;

$$susStbd\ numStdb = \begin{cases} redMod \equiv nplusm \Rightarrow w \\ redMod \equiv nwayactive \Rightarrow 0 \\ redMod \equiv noredundancy \Rightarrow 0 \\ redMod \equiv 2n \Rightarrow 1 \\ redMod \equiv nway \Rightarrow 0 \end{cases}$$

is the number of SUs that can have only standby assignments;
susSpare is the number of spare SUs.
All SI templates compose the set
SIT={siTemp$_i$; 0<=i<|SIT|}.
This set is a mandatory input and remains constant. It is provided by the site designer.

Node Templates
The node template is a tuple
nodeTemp=<numNodes>, where
numNodes is the number of nodes created based on the template.
All node templates compose the set
NodeTemp={nodeTemp$_i$; 0<=i<|NodeTemp|}.
This set is a mandatory input and remains constant. It is provided by the site designer.

Outputs to Generate
Components
A component has a name and belongs to component type. It is a tuple comp=<safComp, ct>, where ct ∈ CT;
safComp is a tuple safComp=<safSu, rdn>, where
safSu is a SAF compliant LDAP distinguished name of the SU the component belongs to and rdn is a relative distinguished name of the component, which is unique within the SU.

Service Units
A service unit is a tuple
su=<safSu, sut, memComps>, where
safSu is a tuple safSu=<safSg, rdn>, where
safSg is a SAF compliant LDAP distinguished name of the SG the service unit belongs to and rdn is a relative distinguished name of the SU which is unique within the SG; sut ∈ SUT;
memComps={memComp$_i$;   0<=i<|memComps|, ∀memComp.safComp.safSu==safSu;}
memComp={ } at the start of the configuration generation.

Service Groups
A service group is a tuple
sg=<safSg, sgt, memSus, nodeGroup>, where
safSg is a tuple safSg=<safApp, rdn>, where
safApp is a SAF compliant LDAP distinguished name of the application the service group belongs to and
rdn is a relative distinguished name of the SG, which is unique within the application; sgt ∈ SGT;
memSus={memSu$_i$; 0<=i<|memSus|, memSu$_i$.sut ∈ sgt.sgt-Sut and ∀memSu.safSu.safSg==safSg;}
memSUs={ } at the start of the configuration generation
nodeGroup={node$_i$; 0<=i<|nodeGroup|,}; the nodeGroup ⊣ Cluster on which the SG is distributed Component Service Instances
A component service instance is a tuple
csi=<safCsi, cst, attrValues>, where
safCsi is a tuple safCsi=<safSi, rdn>, where
safSi is a SAF compliant LDAP distinguished name of the service instance the component service instance belongs to and
rdn is a relative distinguished name of the CSI, which is unique within the service instance; cst ∈ CST;
attrValues={attrValue$_i$; 0<=i<|cst|}
attrValue=<attr, value>, where
∀attrValue.attr ∈ cst.attr;
attrValue.value is a value set for the attribute
attrValues={ } the method does not cover the generation of attribute values. This is a potential future enhancement.

Service Instances
A service instance is a tuple
si=<safSi, st, sg, memCsis>, where
safSi is a tuple safSi=<safApp, rdn>, where
safApp is a SAF compliant LDAP distinguished name of the application the service instance belongs to and
rdn is a relative distinguished name of the SI, which is unique within the application; st ∈ ST;
memCsis={memCsi$_i$;   0<=i<|memCsis|, ∀memCsi.cst∃st.cst; and ∀memCsi.safCsi.safSi==safSi;}
memCsis={ } at the start of the configuration generation
sgSis={si$_i$; 0<=i<|sgSis|, ∀si$_i$.sg==sg} the set of SIs protected by the same service group, they specify the same service group.

Applications
The application for which the configuration is generated is a tuple
app=<safApp, memSgs, memSis>, where
safApp is a distinguished name of the application;
memSgs={memSg$_i$;   0<=i<|memSgs|, ∀memSg.safSg.safApp==safApp;} memSgs={ } at the start of the configuration generation.
memSis={memSi$_i$;   0<=i<|memSis|, ∀memSi.sajSi.safApp==safApp;}
memSis={ } at the start of the configuration generation.
All applications compose the set
Apps={app$_i$; 0<=i<|Apps|}

Nodes
node=<safAmfNode, hostedSus>, where
safAmfNode is a distinguished name of the node;
hostedSus={hostedSu$_i$; 0<=i<|hostedSus|}
hostedSus={ } at the start of the configuration generation.
All nodes compose the cluster:
Cluster={node$_i$; 0<=i<|Cluster|}

Configuration Generation
calculateSuActLoad Method
Input
siTemp, an SI template
Output
suActCap, the required active capability for the SU with respect to the SI
Functional Description
The required SU active capabilities are calculated with respect to the SI template with the assumption that an SU provides a group of SIs from a single template. In the formula ceil( ) is used to round up to the nearest integer.

return $$suActLoad = \begin{cases} redMod \equiv nway \Rightarrow \text{ceil}\left(\dfrac{siTemp.numSIs}{siTemp.numSUs.sus - \begin{cases} siTemp.numSUs.susSpare \equiv 0 \Rightarrow 1 \\ \Rightarrow siTemp.numSUs.susSpare \end{cases}}\right) \\ redMod \equiv nwayactive \Rightarrow \text{ceil}\left(\dfrac{siTemp.numSIs \times siTemp.numAct}{siTemp.numSUs.susAct}\right) \\ redMod \equiv noredundancy \Rightarrow 1 \\ redMod \equiv 2n \Rightarrow siTemp.numSIs \\ redMod \equiv nplusm \Rightarrow \text{ceil}\left(\dfrac{siTemp.numSIs}{siTemp.numSUs.susAct}\right) \end{cases}$$

calculateSuStdbLoad Method
Input
    siTemp, an SI template
Output
    suStdbCap, the required standby capability for the SU with respect to the SI
Function Description
    The required SU standby capabilities are calculated with respect to the SI template with the assumption that an SU provides a group of SIs from a single template. In the formula ceil( ) is used to round up to the nearest integer.

return $$suStdbLoad = \begin{cases} redMod \equiv nway \Rightarrow \text{ceil}\left(\dfrac{siTemp.numSIs \times siTemp.numStdb}{siTemp.numSUs.sus - \begin{cases} siTemp.numSUs.susSpare \equiv 0 \Rightarrow 1 \\ \Rightarrow siTemp.numSUs.susSpare \end{cases}}\right) \\ redMod \equiv nwayactive \Rightarrow 0 \\ redMod \equiv noredundancy \Rightarrow 0 \\ redMod \equiv 2n \Rightarrow siTemp.numSIs \\ redMod \equiv nplusm \Rightarrow \text{ceil}\left(\dfrac{siTemp.numSIs}{siTemp.numSUs.susStdb}\right) \end{cases}$$

createAppType Method
Input
    sgt, an service group type
Output
    appt, an application type
Function Description
    This function creates an application type that supports a given service group type.
Begin
    Create a new application type appt={sgt}
    ADD appt TO createdAPPTs
End createSgType Method
Input
    sut, an service unit type
    siTemp.redMod, the redundancy model required by the SI template
Output
    sgt, a service group type
Function Description
    This function creates a service group type that supports a given service unit type, and sets the redundancy model of this service group to same one of the SI template

```
BEGIN
    Create a new service group type sgt = <sgtSut, redMod>
    ADD sut TO sgt.sgtSut
    SET sgt.redMod TO siTemp.redMod
    ADD sgt TO createdSGTs
END
``` createSuType Method
Input
    siTemp, an SI template
Output
    sut, a service unit type
Function Description
    This function creates a service unit type that supports a given service type.

```
BEGIN
    Create a new service unit sut=<sutCt, sutServices>
    ADD siTemp.st TO sut.sutServices
    FOR every csiTemp IN siTemp. sicsTemps
        CALL findOrphanCT WITH siTemp.csiTemp, siTemp
            RETURNING foundCT //foundCT is the found
            component type
        IF foundCT IS Null THEN
            SET sut TO Null // Delete the created SU Type
            BREAK
        ELSE
            SET memCT.ct TO foundCT
            SET memCT.maxComp TO no limit
            ADD memCT TO sut.sutCt
            ADD sut TO createdSUTs
        ENDIF
    ENDFOR
    RETURN sut
END
``` findAppt Method
Input
    givenSgt, service group type
Output
    appt an application type
Function Description
    This function searches for the first created application type that can support the given SG type. This function is NOT used for finding application types that are not created Modifications to this function are possible based of preferences regarding the extensibility of created application types

```
BEGIN
    BOOLEAN found = false
    FOR every appt IN createdAPPT
        FOR every sgt IN appt
            IF sgt = givenSgt THEN
                RETURN appt
                SET found TO true
                BREAK out of createdAPPT
            ENDIF
        ENDFOR
    ENDFOR
```

-continued

```
            IF found = false THEN
                RETURN Null
            ENDIF
    END
``` findSgt Method

Input givenSut service unit type
  redMod, a redundancy model

Output
  sgt, a service group type

Function Description
This function searches for the first created SG type that can support the given SU type. This function is NOT used for finding SG types that are not created.

```
BEGIN
    BOOLEAN found = false
    FOR every sgt IN createdSGTs
        IF sgt.redMod = redMod THEN
```

-continued

```
            FOR every sut IN sgt.sgtSut
                IF sut = givenSut THEN
                    RETURN sgt
                    SET found TO true
                    BREAK out of createdSGTs
                ENDIF
            ENDFOR
        ENDIF
    ENDFOR
    if found = false THEN
        RETURN Null
END
``` findSut Method

Input siTemp, an SI template
  sutSet, a set of SU types $\subset$ SUT// we could be looking in orphanSUTs or sgt.sgtSut or createdSUTs Output sut, a service unit type Function Description
This function searches for the first SU type that can support the SIs of the given template siTemp. Optimization may be added depending on other requirements.

```
BEGIN
    BOOLEAN found = false
    FOR every sut IN sutSet
        FOR every st IN sut.Services
            IF st = siTemp.st THEN
                FOR every csiTemp in siTemp.sicsTemps
                    SET found TO false
                    CALL findCT WITH siTemp,csiTemp,sut RETURNING foundCt
                    IF foundCt = Null
                    THEN //this sut is not valid
                        CONTINUE and GO TO next sut in the sutSet
                    ELSE
                        SET found TO true
                    ENDIF
                ENDFOR
                IF found = true THEN
                    RETURN sut //the sut in the current
                    sutSet iteration
                    BREAK from the sutSet loop
                ENDIF
            ENDIF
        ENDFOR
    ENDFOR
    IF found = false THEN//all the su types are not valid
        RETURN Null
    ENDIF
END
``` findCt Method

Input siTemp, an SI template csiTemp, a CSI template sut, a service unit type

Output ct, a component type

Function Description

This function searches for the first component type that can support the CSIs of the given template csiTemp. Optimization may be added depending on other requirements.

```
BEGIN
    BOOLEAN found = false
    FOR every memCt IN sutCt
        IF memCt.ct.csCapability.cst = csiTemp.cst THEN
            CASE siTemp.redMod OF
                nway:
                    IF memCt.ct.csCapability.compCap = x_active_and_y_standby THEN
                        CALL calculateSuActLoad WITH siTemp RETURNING suActLoad
                        CALL calculateSuStandbyLoad WITH siTemp RETURNING
                        suStandby
                        IF memCt.maxComp * memCt.ct.csCapability.maxActive >
                            csiTemp.numCsi * suActLoad
                            AND
                            memCt.maxComp * memCt.ct.csCapability.maxStandby >
                            csiTemp.numCsi * suStandbyLoad THEN
                                SET found TO true
                                RETURN memCt.ct
                                BREAK from the sutCt loop
                        ELSE
                            GO to next memCt
                        ENDIF
                    ENDIF
                OTHERS: //in case of other redundancy models
                    CALL calculateSuActLoad WITH siTemp RETURNING suActLoad
                    CALL calculateSuStandbyLoad WITH siTemp RETURNING suStdbLoad
                    IF memCt.maxComp * memCt.ct.csCapability.maxActive >
                        csiTemp.numCsi * suActLoad
                        AND
                        memCt.maxComp * memCt.ct.csCapability.maxStdby >
                        csiTemp.numCsi * suStdbLoad THEN
                            found = true
                            RETURN memCt.ct
                            BREAK from the sutCt loop
                    ELSE
                        GO to next memCt
                    ENDIF
            ENDCASE
        ENDIF
    ENDFOR
    IF found = false THEN
        RETURN Null
    ENDIF
END
``` findOrphanCt Method
Input
   siTemp, an SI template
   csiTemp, a CSI template
Output
   ct, a component type
Function Description
This function searches for the first component type in orphanCTS that can support the CSIs of the given template csiTemp. Optimization may be added depending on other requirements.

```
BEGIN
    BOOLEAN found = false
    For every ct IN orphanCTS
        CASE siTemp.redMod OF
            nway:
                IF ct.csCapability.compCap IS NOT x_active_and_y_standby THEN
                    CONTUNUE and GO TO next ct in orphanCTs
                ELSEIF ct.csCapability.cst = csiTemp.cst THEN
                    RETURN ct
                    SET found TO true
                    BREAK out of orphanCTs
                ENDIF
            OTHERS:
                IF ct.csCapability.cst = csiTemp.cst THEN
                    RETURN ct
                    SET found TO true
                    BREAK out of orphanCTS
        ENDCASE
    ENDFOR
    IF found = false
        RETURN Null
    ENDIF
END
``` calculateNumOfComp Method
Input.
   ct, a component type
   siTemp, an SI template
   csiTemp, an CSI template
Output
   numOfComp, an integer reflecting the number of component
Function Description
This function calculates the number of components of a given component type that need to be created inside a particular service unit

```
BEGIN
    FOR every csCapability IN ct
        IF csCapability.cst = csiTemp.cst THEN
            CALL calculateSuActLoad WITH siTemp
                RETURNING suActLoad
            CALL calculateSuStandbyLoad WITH siTemp
                RETURNING suStdbLoad
            numOfComp = CEIL ( MAX ( (csiTemp.numCsi *
                suActLoad )/csCapability.maxAct,
                            (csiTemp.numCsi *
                            suStdbLoad )/
                            csCapability.maxAct))
            RETURN numOfComp
            BREAK out of ct loop
        ENDIF
    ENDFOR
END
``` assigntoNode Method
Input
   su, an service unit
   nodeGroup, a node group
Output
   No output Function Description
This function will assign the given service unit to a node that have the smallest number of service units assigned to it.

```
BEGIN
    BOOLEAN assigned = false
    FOR every node IN the cluster
        IF |node.hostedSus| < |firstnode.hostedSus|
            THEN // first node is the first node in the cluster
            ADD su TO node.Sus
            ADD node TO nodeGroup
            SET assigned TO true
            BREAK out of cluster
        ENDIF
    ENDFOR
    IF assigned = false THEN
        ADD su TO firstnode.Sus
        ADD first node TO nodeGroup
    ENDIF
``` generateConf Method
Input
   CT all component types
   CST all component service types
   ST all service types
   SIT all service instance templates
   CSIT all component service instance templates
   SUT service unit types
   SGT service group types APPT application types
nodeTemp the node template userPerference is a set of preferences that guides the configuration generation. They allow for different options and optimization and can be extended accordingly. The pseudo-code does not reflect them.

Output
    Apps, i.e. AMF entities for all applications distributed on the nodes of a cluster. Note that the sets of types provided as input are also updated with the created entity types.
Function Description
    This is the main function that is responsible for creating all the entities in AMF configuration, and populate their attributes.

```
BEGIN
    BOOLEAN foundSut = false
    FOR every siTemp IN SIT
        foundSut = false
        FOR every appt IN APPT
            FOR every sgt IN appt.sgt
                IF sgt.redMod = siTemp.redMod THEN
                    CALL findSut WITH siTemp, sgt.sgtSut RETURNING sut
                    IF sut IS NOT Null THEN
                        SET foundSut TO true
                        Create new application app = <"safApp=...", appt, memSgs, memSis>
                        Create new service group sg=< "safSg=... ", sgt, memSus,
                        nodeGroup>
                        ADD sg TO app.memSgs
                        Create new service unit su = <"safSu=... ", sut, memComps>
                        ADD su TO sg.memSus
                        FOR every siTemp.csiTemp in siTemp.sicsTemps
                            CALL findCt WITH sut, siTemp, csiTemp RETURNING ct
                            CALL calculateNumOfComp WITH ct, siTemp, csiTemp
                            RETURNING numOfComp
                            FOR numOfComp
                                Create component comp = < "safComp=... ", ct >
                                ADD comp TO su.memComps
                            ENDFOR
                        ENDFOR
                        CALL assigntoNode WITH su, sg.nodeGroup
                        FOR siTemp.numSUs-1//cloning the created su.
                            Create new service unit newSu = <"safSu=... ", sut,
                                                                                memComps>
                            FOR every comp IN su.memComps
                                create component newComp
                                                        < "safComp=... ",comp.ct>
                                ADD newComp TO newSu.memComps
                            ENDFOR
                            CALL assigntoNode WITH newSu, sg.nodeGroup
                            ADD newSu TO sg.memSus
                        ENDFOR
                        ADD app TO Apps
                        CONTINUE and GO to next SI template
                    ENDIF
                ENDIF
            ENDFOR
        ENDFOR
        IF foundSu = false THEN //no application type was found
            FOR every sgt IN orphanSGT
                IF sgt.redMod = siTemp.redMod THEN
                    CALL findSut WITH siTemp, sgt.sgtSut RETURNING sut
                    IF sut IS NOT Null THEN
                        SET foundSut TO true
                        CALL findAppt WITH sgt RETURNING appt
                        IF appt = Null THEN
                            CALL createApptype WITH sgt RETURNING appt
                        ENDIF
                        Create new application app = <"safApp=...", appt, memSgs, memSis>
                        Create new service group sg=< "safSg=... ", sgt, memSus,
                        nodeGroup>
                        ADD sg TO app.memSgs
                        Create new service unit su = <"safSu=... ", sut, memComps>
                        ADD su TO sg.memSus
                        FOR every siTemp.csiTemp in siTemp.sicsTemps
                            CALL findCt WITH sut, siTemp, csiTemp RETURNING ct
                            calculateNumOfComp WITH ct, siTemp, csiTemp
                            RETURNING numOfComp
                            FOR numOfComp
                                Create component comp = < "safComp=... ", ct >
                                ADD comp TO su.memComps
                            ENDFOR
                        ENDFOR
                        CALL assigntoNode WITH su, sg.nodeGroup
```

```
                    FOR siTemp.numSUs-1//cloning the created su.
                        Create new service unit newSu = <"safSu=... ", sut,
                                                                                    memComps>
                            FOR every comp IN su.memComps
                                create component newComp
                                                    < "safComp=... ",comp.ct>
                                ADD newComp TO newSu.memComps
                            ENDFOR
                            CALL assigntoNode WITH newSu, sg.nodeGroup
                            ADD newSu TO sg.memSus
                    ENDFOR
                    ADD app TO Apps
                    CONTINUE and GO to next SI template
                ENDIF
            ENDIF
        ENDFOR
ENDIF
IF foundSu = false THEN //no sg type was found
    CALL findSut WITH siTemp, orphanSUTs RETURNING sut
    IF sut IS NOT Null THEN
        SET foundSut TO true
        CALL findSgt WITH sut, siTemp.redMod RETURNING sgt
        IF sgt = Null THEN
            CALL createSgtype WITH sut, siTemp.redMod RETURNING sgt
        ENDIF
        CALL findAppt WITH sgt RETURNING appt
        IF appt = Null THEN
            CALL createApptype WITH sgt RETURNING appt
        ENDIF
        Create new application app = <"safApp=...", appt, memSgs, memSis>
        Create new service group sg=< "safSg=... ", sgt, memSus,
        nodeGroup>
        ADD sg TO app.memSgs
        Create new service unit su = <"safSu=... ", sut, memComps>
        ADD su TO sg.memSus
        FOR every siTemp.csiTemp in siTemp.sicsTemps
            CALL findCt WITH sut, siTemp, csiTemp RETURNING ct
            CALL calculateNumOfComp WITH ct, siTemp, csiTemp
            RETURNING numOfComp
            FOR numOfComp
                Create component comp = < "safComp=... ", ct >
                ADD comp TO su.memComps
            ENDFOR
        ENDFOR
        CALL assigntoNode WITH su, sg.nodeGroup
        FOR siTemp.numSUs-1//cloning the created su.
            Create new service unit newSu = <"safSu=... ", sut, memComps>
            FOR every comp IN su.memComps
                create component newComp < "safComp=... ",comp.ct>
                ADD newComp TO newSu.memComps
            ENDFOR
            CALL assigntoNode WITH newSu, sg.nodeGroup
            ADD newSu TO sg.memSus
        ENDFOR
        ADD app TO Apps
        CONTINUE and GO to next SI template
    ENDIF
ENDIF
IF foundSu = false THEN //no su type was found
    CALL findSut WITH siTemp, createdSUTs RETURNING sut
    IF sut = Null THEN
        CALL createSutype WITH siTemp RETURNING sut
    ENDIF
    IF sut IS NOT Null THEN
        SET foundSut TO true
        CALL findSgt WITH sut, siTemp.redMod RETURNING sgt
        IF sgt = Null THEN
            CALL createSgtype WITH sut, siTemp.redMod RETURNING sgt
        ENDIF
        CALL findAppt WITH sgt RETURNING appt
        IF appt = Null THEN
            CALL createApptype WITH sgt RETURNING appt
        ENDIF
        Create new application app = <"safApp=...", appt, memSgs, memSis>
        Create new service group sg=< "safSg=... ", sgt, memSus, nodeGroup>
        ADD sg TO app.memSgs
        Create new service unit su = <"safSu=... ", sut, memComps>
        ADD su TO sg.memSus
        FOR every siTemp.csiTemp in siTemp.sicsTemps
            CALL findCt WITH sut, siTemp, csiTemp RETURNING ct
```

-continued

```
                CALL calculateNumOfComp     WITH ct, siTemp, csiTemp
                RETURNING numOfComp
                FOR numOfComp
                    Create component comp = < "safComp=... ", ct >
                    ADD comp TO su.memComps
                ENDFOR
            ENDFOR
            CALL assigntoNode WITH su, sg.nodeGroup
            FOR siTemp.numSUs–1//cloning the created su.
                Create new service unit newSu = <"safSu=... ", sut, memComps>
                FOR every comp IN su.memComps
                    create component newComp < "safComp=... ",comp.ct>
                    ADD newComp TO newSu.memComps
                ENDFOR
                CALL assigntoNode WITH newSu, sg.nodeGroup
                ADD newSu TO sg.memSus
            ENDFOR
            ADD app TO Apps
            CONTINUE and GO to next SI template
        ENDIF
    ENDIF
    IF foundSu = false THEN// no types were found to support the si template
        MESSAGEBOX ("Sorry no types were found to support the current siTemplate")
        GO TO next SI template
    ENDIF
ENDFOR
ADD createdAPPTs TO APPT
ADD createdSGTs TO SGT
ADD createdSUTs TO SUT
END
```

Note that although the foregoing, exemplary pseudo-code performs evaluations between SI requirements and type capabilities in a strict sense, i.e., checking to see if each value in type's capabilities tuple or set is equal to a corresponding value in the SI requirements tuple or set to determine if a type supports those requirements, other evaluation metrics can be used to determine the suitability of a type. For example, for created application types an AMF configuration generator according to exemplary embodiments may decide that it is sufficient that the required set of SG Type is present as a subset. This allows for the extension of existing created types. As a result the configuration will have different numbers of application types and therefore different number of applications, which reflects different strategies of grouping, e.g., grouping by functionality. Strict equivalence results in a 1:1 relation between created SU types, created SG types and created application types. Allowing subsets without other strategies results in a single APPT as it was done in the bottom-up approach.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for generating a configuration for an Availability Management Framework (AMF) comprising:
    selecting entity types from an entity types file which can provide a set of service instances by:
        evaluating entity types associated with an application type in said entity types file;
        determining if a service group type associated with application type supports a predetermined redundancy model;
        if said service group type does support said predetermined redundancy model, then determining if (a) a service unit type associated with said service group type can provide a predetermined service and (b) said service unit type can support an expected load associated with said predetermined service; and
        if conditions (a) and (b) are met, then selecting, as said entity types, said service unit type, said service group type and said application type;
    generating entities associated with the selected entity types; and
    distributing at least some of the generated entities on nodes of a cluster;
    wherein if no service group type associated with any application type in said entity types file supports said predetermined redundancy model, then:
        evaluating an orphan service group type in said entity types file to determine if said orphan service group type supports said predetermined redundancy model;
        if said orphan service group type does support said predetermined redundancy model, then determining if (a) a service unit type associated with said orphan service group type can provide said predetermined service and (b) said service unit type associated with said orphan service group type can support said expected load associated with said predetermined service;
        identifying an adoptive application type which can support said orphan service group type; and
        selecting, as said entity types, said service unit type, said orphan service group type and said adoptive application type.

2. The method of claim 1, wherein if said step of determining if said service group type associated with said application type supports said predetermined redundancy model returns a negative result, then determining if another service group type associated with said application type in said entity types file supports said predetermined redundancy model.

3. The method of claim 2, wherein if no service group type associated with said application type supports said predetermined redundancy model, then evaluating service group types associated with other application types in said entity types file.

4. The method of claim 1, wherein if no created application types in said entity types file has said orphan service group type as a member or can be extended to provide said orphan service group type, then creating a new application type as said adoptive application type.

5. The method of claim 1, wherein if no orphan service group type supports said predetermined redundancy model, then evaluating at least one orphan service unit type to determine if (a) said at least one orphan service unit can provide said predetermined service and (b) said at least one orphan service unit type can support said expected load associated with said predetermined service;
identifying an adoptive created application type and an adoptive created service group type which can support said at least one orphan service unit type; and
selecting, as said entity types, said orphan service unit type, said adoptive service group type and said adoptive application type.

6. The method of claim 5, wherein if no orphan service unit is capable of supporting said predetermined service, then evaluating at least one orphan component type to determine if said at least one orphan component type can support said predetermined service and, if so, generating higher level types using said at least one orphan component type.

7. The method of claim 1, further comprising the step of:
storing said generated configuration as a file in an Information Model Management (IMM) eXternal Markup Language (XML) format in a memory device.

8. A non-transitory computer-readable medium containing instructions stored thereon which, when executed by a computer or a processor, perform the steps of:
selecting entity types from an entity types file which can provide a set of service instances by:
evaluating entity types associated with an application type in said entity types file;
determining if a service group type associated with said application type supports a predetermined redundancy model;
if said service group type does support said predetermined redundancy model, then determining if (a) a service unit type associated with said service group type can provide a predetermined service and (b) said service unit type can support an expected load associated with said predetermined service; and
if conditions (a) and (b) are met, then selecting, as said entity types, said service unit type, said service group type and said application type;
generating entities associated with the selected entity types; and
distributing at least some of the generated entities on nodes of a cluster;
wherein if no service group type associated with any application type in said entity types file supports said predetermined redundancy model, then:
evaluating an orphan service group type in said entity types file to determine if said orphan service group type supports said predetermined redundancy model;
if said orphan service group type does support said predetermined redundancy model, then determining if (a) a service unit type associated with said orphan service group type can provide said predetermined service and (b) said service unit type associated with said orphan service group type can support said expected load associated with said predetermined service;
identifying an adoptive application type which can support said orphan service group type; and
selecting, as said entity types, said service unit type, said orphan service group type and said adoptive application type.

9. The non-transitory computer-readable medium of claim 8, wherein if said step of determining if said service group type associated with said application type supports said predetermined redundancy model returns a negative result, then determining if another service group type associated with said application type in said entity types file supports said predetermined redundancy model.

10. The non-transitory computer-readable medium of claim 9, wherein if no service group type associated with said application type supports said predetermined redundancy model, then evaluating service group types associated with other application types in said entity types file.

11. The non-transitory computer-readable medium of claim 8, wherein if no application types in said entity types file have said orphan service group type as a member or can be extended to provide said orphan service group type, then creating a new application type as said adoptive application type.

12. The non-transitory computer-readable medium of claim 8, wherein if no orphan service group type supports said predetermined redundancy model, then evaluating at least one orphan service unit type to determine if (a) said at least one orphan service unit can provide said predetermined service and (b) said at least one orphan service unit type can support said expected load associated with said predetermined service;
identifying an adoptive created application type and an adoptive created service group type which can support said at least one orphan service unit type; and
selecting, as said entity types, said orphan service unit type, said adoptive service group type and said adoptive application type.

13. The non-transitory computer-readable medium of claim 12, further comprising the step of:
storing said generated configuration as a file in an Information Model Management (IMM) eXternal Markup Language (XML) format in a memory device.

14. The non-transitory computer-readable medium of claim 12, wherein if no orphan service unit is capable of supporting said predetermined service, then evaluating at least one orphan component type to determine if said at least one orphan component type can support said predetermined service and, if so, generating higher level types using said at least one orphan component type.

15. A system comprising:
a processor for generating a configuration for an Availability management Framework (AMF), said processor being configured to perform the functions of:
selecting entity types from an entity types file which can provide a set of service instances by:
evaluating entity types associated with an application type in said entity types file;
determining if a service group type associated with said application type supports a predetermined redundancy model;
if said service group type does support said predetermined redundancy model, then determining if (a) a service unit type associated with said service group type can provide a predetermined service and (b) said service unit type can support an expected load associated with said predetermined service; and if conditions (a) and (b) are met, then selecting, as said entity types, said service unit type, said service group type and said application type;

generating entities associated with the selected entity types; and distributing at least some of the generated entities on nodes of a clusters;

wherein if no service group type associated with any application type in said entity types file supports said predetermined redundancy model, then:

evaluating an orphan service group type in said entity types file to determine if said orphan service group type supports said predetermined redundancy model;

if said orphan service group type does support said predetermined redundancy model, then determining if (a) a service unit type associated with said orphan service group type can provide said predetermined service and (b) said service unit type associated with said orphan service group type can support said expected load associated with said predetermined service;

identifying an adoptive application type which can support said orphan service group type; and selecting, as said entity types, said service unit type, said orphan service group type and said adoptive application type.

16. The system of claim 15, wherein if said processor returns a negative result in determining if said service group type associated with said application type supports said predetermined redundancy model, then said processor determines if another service group type associated with said application type in said entity types file supports said predetermined redundancy model.

17. The system of claim 16, wherein if no service group type associated with said application type supports said predetermined redundancy model, then said processor evaluates service group types associated with other application types in said entity types file.

18. The system of claim 15, wherein if said processor determines that no application types in said entity types file has said orphan service unit group type as a member or can be extended to provide said orphan service unit group type, then creating a new application type as said adoptive application type.

19. The system of claim 18, wherein if no orphan service group type supports said predetermined redundancy model, then said processor evaluates at least one orphan service unit type to determine if (a) said at least one orphan service unit can provide said predetermined service and (b) said at least one orphan service unit type can support said expected load associated with said predetermined service, said processor identifies an adoptive created application type and an adoptive created service group type which can support said at least one orphan service unit type; and selects, as said entity types, said orphan service unit type, said adoptive service group type and said adoptive application type.

20. The system of claim 19, wherein if no orphan service unit is capable of supporting said predetermined service, then said processor evaluates at least one orphan component type to determine if said at least one orphan component type can support said predetermined service and, if so, generates higher level types using said at least one orphan component type.

21. The system of claim 15, further comprising:
a memory device for storing said generated configuration as a file in an Information Model Management (IMM) eXternal Markup Language (XML) format.

* * * * *

UNITED STATES PATENT AND TRADEMARK OFFICE
CERTIFICATE OF CORRECTION

PATENT NO. : 8,006,130 B2
APPLICATION NO. : 12/242269
DATED : August 23, 2011
INVENTOR(S) : Kanso et al.

It is certified that error appears in the above-identified patent and that said Letters Patent is hereby corrected as shown below:

In Column 4, Line 2, delete "embodiments;." and insert -- embodiments; --, therefor.

In Column 4, Line 4, delete "embodiments; and" and insert -- embodiments; --, therefor.

In Column 4, Line 24, delete "invention instead," and insert -- invention. Instead, --, therefor.

In Column 6, Lines 13-14, delete "environment" and insert -- environment, --, therefor.

In Column 8, Line 18, delete "requested." and insert -- requested --, therefor.

In Column 9, Line 61, delete "CST. B" and insert -- CST B --, therefor.

In Column 11, Line 56, delete "ST}." and insert -- ST} --, therefor.

In Column 13, Line 45, delete "coop=" and insert -- comp= --, therefor.

In Column 14, Line 19, delete "{attrValue$_j$;" and insert -- {attrValue$_i$; --, therefor.

In Column 14, Line 36, delete " $st.cst;$ " and insert -- $\exists st.cst;$ --, therefor.

In Column 15, Lines 14-16, delete " $\begin{cases} sut \neq \{\} \Rightarrow \forall sut.sutCt_j.csCapability_k.cst \equiv cst \Rightarrow vct_i \\ sut \equiv \{\} \forall ct_j.csCapability.cst \equiv cst \Rightarrow vct_i \end{cases}$ , " and insert -- $\begin{cases} sut \neq \{\} \Rightarrow \forall sut.sutCt_j.csCapability_k.cst \equiv cst \Rightarrow vct_i \\ sut \equiv \{\} \Rightarrow \forall ct_j.csCapability.cst \equiv cst \Rightarrow vct_i \end{cases}$ , --, therefor.

Signed and Sealed this
Sixteenth Day of October, 2012

David J. Kappos
*Director of the United States Patent and Trademark Office*

CERTIFICATE OF CORRECTION (continued)
U.S. Pat. No. 8,006,130 B2

Column 16, Line 41, delete "$\operatorname{ceil}\left(\dfrac{siTemp.numSIs}{siTemp.numSUs.susAct}\right)$" and insert -- $\operatorname{ceil}\left(\dfrac{siTemp.numSIs}{siTemp.numSUs.susStdb}\right)$ --, therefor.

In Column 16, Line 46, delete "Si" and insert -- SI --, therefor.

In Column 16, Lines 58-64, delete "$\left\{ sut_j \in SUT; \begin{array}{l} \{vsut_i; SUT \neq \{\}\} \end{array} \middle| \begin{array}{l} siTemp.redMod \neq nway \Rightarrow \forall\, sut_j.st \equiv \\ siTemp.st \Rightarrow vsut_i \\ siTemp.redMod \equiv nway \Rightarrow \\ \Rightarrow \forall\, sut_j.memCt.csCapability.compCap \equiv \\ x\_active\_and\_y\_standby \wedge \\ \wedge\, \forall\, sut_j.st \equiv siTemp.st \Rightarrow vsut_i \end{array} \right.$" and insert -- $\left\{ \begin{array}{l}\{vsut_i; SUT \neq \{\}\} \\ sut_j \in SUT; \end{array} \middle| \begin{array}{l} siTemp.redMod \neq nway \Rightarrow \forall sut_j.st \equiv siTemp.st \Rightarrow vsut_i \\ siTemp.redMod \equiv nway \Rightarrow \\ \Rightarrow \forall sut_j.memCt.csCapability.compCap \equiv x\_active\_and\_y\_stanby \wedge \\ \wedge\, \forall sut_j.st \equiv siTemp.st \Rightarrow vsut_i \end{array} \right.$ --, therefor.

In Column 17, Line 62, delete "redMod" and insert -- redMod, --, therefor.

In Column 18, Line 36, delete "group Currently" and insert -- group. Currently --, therefor.

In Column 19, Line 44, delete "sg;nodeGroup" and insert -- sg.nodeGroup --, therefor.

In Column 27, Line 46, delete "(createdSUTs-{})." and insert -- (createdSUTs={}). --, therefor.

In Column 28, Line 14, delete "appt-" and insert -- appt= --, therefor.

In Column 28, Line 43, delete "{esiTemp$_i$;" and insert -- {csiTemp$_i$; --, therefor.

In Column 29, Line 65, delete "memSUs-{}" and insert -- memSUs={} --, therefor.

In Column 29, Line 66, delete "$\dashv$" and insert -- $\subseteq$ --, therefor.

In Column 30, Line 27, delete "$\forall memCsi.cst \dashv \exists st.cst;$" and insert -- $\forall memCsi.cst \Rightarrow \exists st.cst;$ --, therefor.

CERTIFICATE OF CORRECTION (continued)
U.S. Pat. No. 8,006,130 B2

In Column 32, Line 52, delete "created" and insert -- created. --, therefor.

In Column 37, Line 18, delete "CONTUNUE" and insert -- CONTINUE --, therefor.

In Column 47, Line 9, in Claim 15, delete "clusters;" and insert -- cluster; --, therefor.